(12) United States Patent
Gooneratne et al.

(10) Patent No.: US 11,536,129 B2
(45) Date of Patent: Dec. 27, 2022

(54) IMAGE BASED INSPECTION OF WELL EQUIPMENT

(71) Applicant: Saudi Arabian Oil Company, Dhahran (SA)

(72) Inventors: Chinthaka Pasan Gooneratne, Dhahran (SA); Michael Affleck, Aberdeen (GB); Timothy E. Moellendick, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 494 days.

(21) Appl. No.: 16/715,841

(22) Filed: Dec. 16, 2019

(65) Prior Publication Data

US 2020/0190967 A1    Jun. 18, 2020

Related U.S. Application Data

(60) Provisional application No. 62/780,856, filed on Dec. 17, 2018, provisional application No. 62/780,833,
(Continued)

(51) Int. Cl.
*E21B 47/04* (2012.01)
*E21B 17/02* (2006.01)
(Continued)

(52) U.S. Cl.
CPC .............. *E21B 47/04* (2013.01); *E21B 17/02* (2013.01); *E21B 21/08* (2013.01); *E21B 41/00* (2013.01);
(Continued)

(58) Field of Classification Search
CPC .......... E21B 47/04; E21B 47/11; E21B 17/02; E21B 21/08; E21B 41/00; E21B 41/0092;
(Continued)

(56) References Cited

U.S. PATENT DOCUMENTS 5,107,705 A   4/1992  Wraight et al.
7,395,878 B2  7/2008  Reitsma et al.
(Continued)

FOREIGN PATENT DOCUMENTS

GB    2532967     6/2016
NO     343139    11/2018
(Continued)

OTHER PUBLICATIONS

Akersolutions, Aker MH CCTC Improving Safety, Jan. 2008.
(Continued)

*Primary Examiner* — Kerri L McNally
(74) *Attorney, Agent, or Firm* — Fish & Richardson P.C.

(57) ABSTRACT

One or more images of a tubular being run into a well are captured. The one or more images can be captured by an image sensor. The tubular includes a first tubular section and a second tubular section connected together by a connection. An onsite edge gateway local to the image sensor is configured to perform various operations. Based on the captured one or more images, an elevation of the connection relative to a reference elevation of the well is determined. Based on the determined elevation, an operating condition is determined. It is determined whether the operating condition is included in an automation rule. In response to determining that the automation rule includes the operating condition, a signal is transmitted to drive a controllable device.

22 Claims, 11 Drawing Sheets

Related U.S. Application Data filed on Dec. 17, 2018, provisional application No. 62/780,843, filed on Dec. 17, 2018.

(51) Int. Cl.

| | | |
|---|---|---|
| *G01N 21/88* | (2006.01) | |
| *E21B 41/00* | (2006.01) | |
| *E21B 47/00* | (2012.01) | |
| *G06Q 30/06* | (2012.01) | |
| *G06Q 50/02* | (2012.01) | |
| *H04N 5/225* | (2006.01) | |
| *E21B 47/11* | (2012.01) | |
| *E21B 21/08* | (2006.01) | |
| *E21B 44/02* | (2006.01) | |
| *G01F 1/704* | (2006.01) | |
| *G05B 19/4155* | (2006.01) | |
| *G08B 21/18* | (2006.01) | |
| *E21B 3/04* | (2006.01) | |
| *E21B 19/00* | (2006.01) | |
| *E21B 21/06* | (2006.01) | |
| *E21B 21/10* | (2006.01) | |
| *E21B 33/06* | (2006.01) | |

(52) U.S. Cl.
CPC .......... *E21B 41/0092* (2013.01); *E21B 44/02* (2013.01); *E21B 47/00* (2013.01); *E21B 47/11* (2020.05); *G01F 1/704* (2013.01); *G01N 21/8851* (2013.01); *G05B 19/4155* (2013.01); *G06Q 30/0633* (2013.01); *G06Q 50/02* (2013.01); *G08B 21/187* (2013.01); *H04N 5/225* (2013.01); *E21B 3/04* (2013.01); *E21B 19/008* (2013.01); *E21B 21/062* (2013.01); *E21B 21/106* (2013.01); *E21B 33/061* (2013.01); *G05B 2219/31229* (2013.01); *H04N 2005/2255* (2013.01)

(58) Field of Classification Search
CPC .......... E21B 44/02; E21B 47/00; G01F 1/704; G01N 21/8851; G05B 19/4155; G06Q 30/0633; G06Q 50/02; G08B 21/187; H04N 5/225
USPC .......................................................... 702/9
See application file for complete search history.

(56) References Cited

U.S. PATENT DOCUMENTS

| 8,550,174 | B1 | 10/2013 | Orgeron et al. | |
|---|---|---|---|---|
| 9,328,574 | B2 | 5/2016 | Sehsah | |
| 9,355,440 | B1 | 5/2016 | Chen et al. | |
| 2004/0182574 | A1* | 9/2004 | Adnan | G05B 15/02 379/268 |
| 2008/0173480 | A1 | 7/2008 | Annaiyappa et al. | |
| 2009/0164125 | A1 | 6/2009 | Bordakov et al. | |
| 2014/0270793 | A1 | 9/2014 | Bradford | |
| 2015/0091737 | A1 | 4/2015 | Richardson et al. | |
| 2015/0345261 | A1 | 12/2015 | Kruspe et al. | |
| 2016/0194157 | A1 | 7/2016 | Senn et al. | |
| 2017/0314369 | A1 | 11/2017 | Rosano et al. | |
| 2018/0240322 | A1 | 8/2018 | Potucek et al. | |
| 2018/0300124 | A1* | 10/2018 | Malladi | H04L 65/40 |
| 2018/0315111 | A1 | 11/2018 | Alvo et al. | |
| 2019/0009033 | A1 | 1/2019 | Aykroyd et al. | |
| 2019/0011595 | A1 | 1/2019 | Hou et al. | |
| 2019/0078426 | A1 | 3/2019 | Zheng et al. | |
| 2019/0078626 | A1 | 3/2019 | Silsson | |
| 2019/0090056 | A1 | 3/2019 | Rexach et al. | |
| 2019/0090330 | A1 | 3/2019 | Aykroyd et al. | |
| 2019/0100988 | A1 | 4/2019 | Brian et al. | |
| 2019/0145183 | A1 | 5/2019 | Potash et al. | |
| 2019/0282089 | A1 | 9/2019 | Wang | |
| 2020/0081439 | A1 | 3/2020 | Mukherjee et al. | |
| 2020/0125225 | A1 | 4/2020 | Bettles et al. | |
| 2020/0149936 | A1 | 5/2020 | Xu et al. | |
| 2020/0190959 | A1 | 6/2020 | Gooneratne et al. | |
| 2020/0190963 | A1 | 6/2020 | Gooneratne et al. | |
| 2020/0368967 | A1 | 11/2020 | Zhan et al. | |
| 2021/0340866 | A1 | 11/2021 | Zhan et al. | |

FOREIGN PATENT DOCUMENTS

| NO | 20161842 | 5/2019 |
|---|---|---|
| WO | 2017132297 | 8/2017 |
| WO | 2019055240 | 3/2019 |
| WO | 2019169067 | 9/2019 |
| WO | 2019236288 | 12/2019 |

OTHER PUBLICATIONS

Artymiuk et al., "The new drilling control and monitoring system," Acta Montanistica Slovaca, Sep. 2004, 9(3): 145-151.

PCT International Search Report and Written Opinion in International Appln. No. PCT/US2019/066549, dated Apr. 1, 2020, 19 pages.

GCC Examination Report in GCC Appln. No. GC 2019-38842, dated Nov. 8, 2020, 5 pages.

Magana-more et al., "Well control space out: a deep learning approach for the optimization of drilling safety operations," IEEE Access, 2021, 9, 14 pages.

Koulidis et al., "Field assessment of camera based drilling dynamics," presented at the SPE Middle East Oil & Gas Show and Conference, Manama, Bahrain, Nov.-Dec. 2021, 11 pages.

Anwar et al.,"Fog computing: an overview of big IoT data analytics," Wireless communications and mobile computing, May 2018, 2018: 1-22.

Bilal et al., "Potentials, trends, and prospects in edge technologies: Fog, cloudlet, mobile edge, and micro data centers," Computer Networks, Elsevier, Oct. 2017, 130: 94-120.

Dickens et al., "An LED array-based light induced fluorescence sensor for real-time process and field monitoring," Sensors and Actuators B: Chemical, Elsevier, Apr. 2011, 158(1): 35-42.

Liu et al., "Flow visualization and measurement in flow field of a torque converter," Mechanic automation and control Engineering, Second International Conference on IEEE, Jul. 15, 2011, 1329-1331.

Nuth, "Smart oil field distributed computing," The Industrial Ethernet Book, Nov. 2014, 85(14): 1-3.

PCT International Search Report and Written Opinion in International Appln. No. PCT/US2019/066577, dated Apr. 2, 2020, 18 pages.

PCT International Search Report and Written Opinion in International Appln. No. PCT/US2019/066602, dated Apr. 3, 2020, 15 pages.

GCC Examination Report in GCC Appln. No. GC 2019-38843, dated Nov. 8, 2020, 6 pages.

GCC Examination Report in GCC Appln. No. GC 2019-38844, dated Nov. 5, 2020, 6 pages.

GCC Examination Report in GCC Appln. No. GC 2019-38844, dated May 20, 2021, 4 pages.

GCC Examination Report in GCC Appln. No. GC 2019-38842, dated May 19, 2021, 4 pages.

GCC Examination Report in GCC Appln. No. GC 2019-38843, dated May 18, 2021, 5 pages.

* cited by examiner

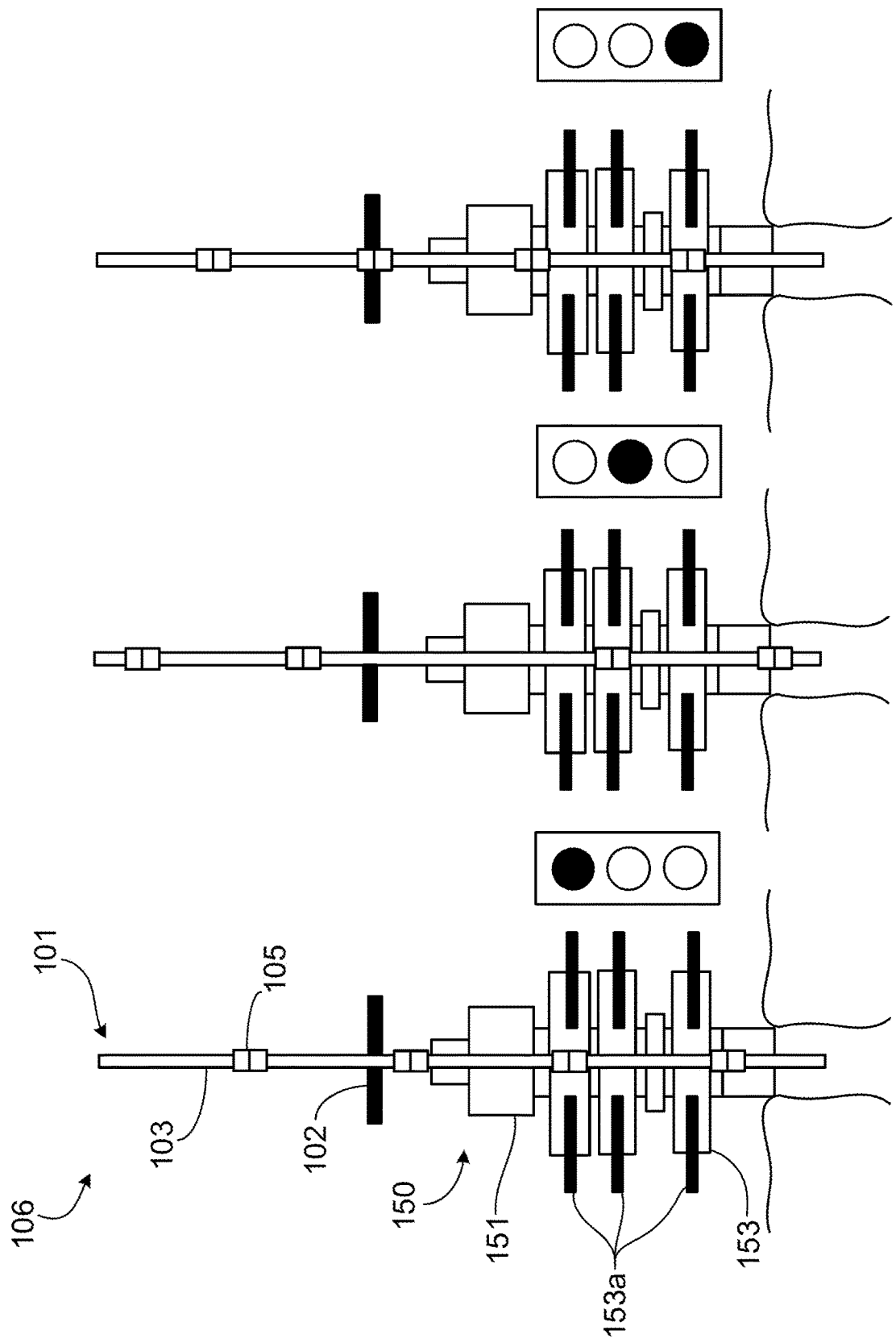

IMAGE BASED INSPECTION OF WELL EQUIPMENT

CROSS-REFERENCE TO RELATED APPLICATIONS

This application claims priority to U.S. Provisional Patent Application No. 62/780,833, filed Dec. 17, 2018, U.S. Provisional Patent Application No, 62/780,843, filed Dec. 17, 2018, and U.S. Provisional Patent Application No. 62/780,856, filed Dec. 17, 2018, the contents of while are hereby incorporated by reference.

TECHNICAL FIELD

This disclosure relates to image-based inspection of well equipment, for example, a drill string being run into a well.

BACKGROUND

Drill rigs are used for drilling and producing hydrocarbons from a well, and include a large number of components and tools that perform complex and often time-consuming operations. Drilling a well is a challenging procedure due to the inability to see the trajectory of the well, rock formations, and the harsh environment downhole. These factors and the many uncertainties and variables during a drilling operation on a rig creates a dynamic drilling process.

SUMMARY

This disclosure describes techniques that can be used for inspecting well equipment. Monitoring the many components during operations on a rig can be difficult and ineffective, and delays or breakdowns in machinery and components can have a negative impact on time and cost during a drilling operation. Certain aspects of the subject matter described can be implemented as a method, for example, to improve operations on a rig. One or more images of a tubular being run into a well are captured. The tubular includes a first tubular section and a second tubular section connected together by a connection. An elevation of the connection relative to a reference elevation of the well is determined based on the captured one or more images. An operating condition is generated based on the determined elevation. It is determined whether the operating condition is included in an automation rule. In response to determining that the automation rule includes the operating condition, a signal is transmitted to drive a controllable device.

This, and other aspects, can include one or more of the following features.

The operating condition can include an alignment position of the connection relative to a blowout preventer of the well.

The automation rule can include a condition in which the connection is aligned with the blowout preventer.

The controllable device can include a control panel in a remote location. Driving the controllable device can include displaying a representation of the operating condition on the control panel.

The controllable device can include an alarm. Driving the controllable device can include triggering the alarm.

The controllable device can include a running tool that is running the tubular into the well. Driving the controllable device can include adjusting a rate at which the running tool is running the tubular into or out of the well.

The controllable device can include the blowout preventer. Driving the controllable device can include closing the blowout preventer.

A rate at which the tubular is being run into the well can be determined based on at least two captured images.

Determining the elevation of the connection can include distinguishing the connection from the first and second tubular sections.

The first tubular section can include a first drill pipe. The second tubular section can include a second drill pipe. The connection can include a tool joint. Distinguishing the connection from the first and second tubular sections can include identifying the tool joint based on detecting an outer diameter of the tool joint.

Certain aspects of the subject matter described can be implemented as a system. The system includes an image sensor and an onsite edge gateway local to the image sensor. The image sensor is configured to capture an image stream of a tubular being run into a well. The tubular includes a first tubular section and a second tubular section connected together by a connection. The onsite edge gateway is communicatively coupled to the image sensor. The onsite edge gateway is configured to perform operations. The operations include receiving an image stream from the image sensor. The operations include determining an elevation of the connection relative to a reference elevation of the well from the image stream. The operations include generating an operating condition based on the determined elevation. The operations include determining whether the operating condition is included in an automation rule. The operations include transmitting a signal to drive a controllable device in a remote location in response to determining that the automation rule includes the operating condition.

This, and other aspects, can include one or more of the following features.

The image sensor can be mounted in a fixed position.

The image sensor can be portable.

The onsite edge gateway can include one or more processors and a computer-readable storage medium coupled to the one or more processors. The computer-readable storage medium can store programming instructions for execution by the one or more processors. The programming instructions can instruct the one or more processors to perform the operations.

Generating the operating condition can include determining an alignment position of the connection relative to a blowout preventer of the well.

The automation rule can include a condition in which the connection is aligned with the blowout preventer.

The system can include the controllable device.

The controllable device can include a control panel. Driving the controllable device can include displaying a representation of the operating condition on the control panel.

The controllable device can include an alarm. Driving the controllable device can include triggering the alarm.

The controllable device can include a running tool configured to run the tubular into the well. Driving the controllable device can include adjusting a rate at which the running tool is running the tubular into or out of the well.

The controllable device can include the blowout preventer. Driving the controllable device can include closing the blowout preventer.

The onsite edge gateway can be configured to determine a rate at which the tubular is being run into the well based on at least two captured images received from the image sensor.

The onsite edge gateway can be configured to distinguish the connection from the first and second tubular sections.

The details of one or more implementations of the subject matter of this specification are set forth in the Detailed Description, the accompanying drawings, and the claims. Other features, aspects, and advantages of the subject matter will become apparent from the description, the claims, and the accompanying drawings.

DESCRIPTION OF DRAWINGS

FIGS. 4A, 4B, and 4C are schematic views of various configurations of the example blowout preventer and the drill string.

DETAILED DESCRIPTION

Figure 1:
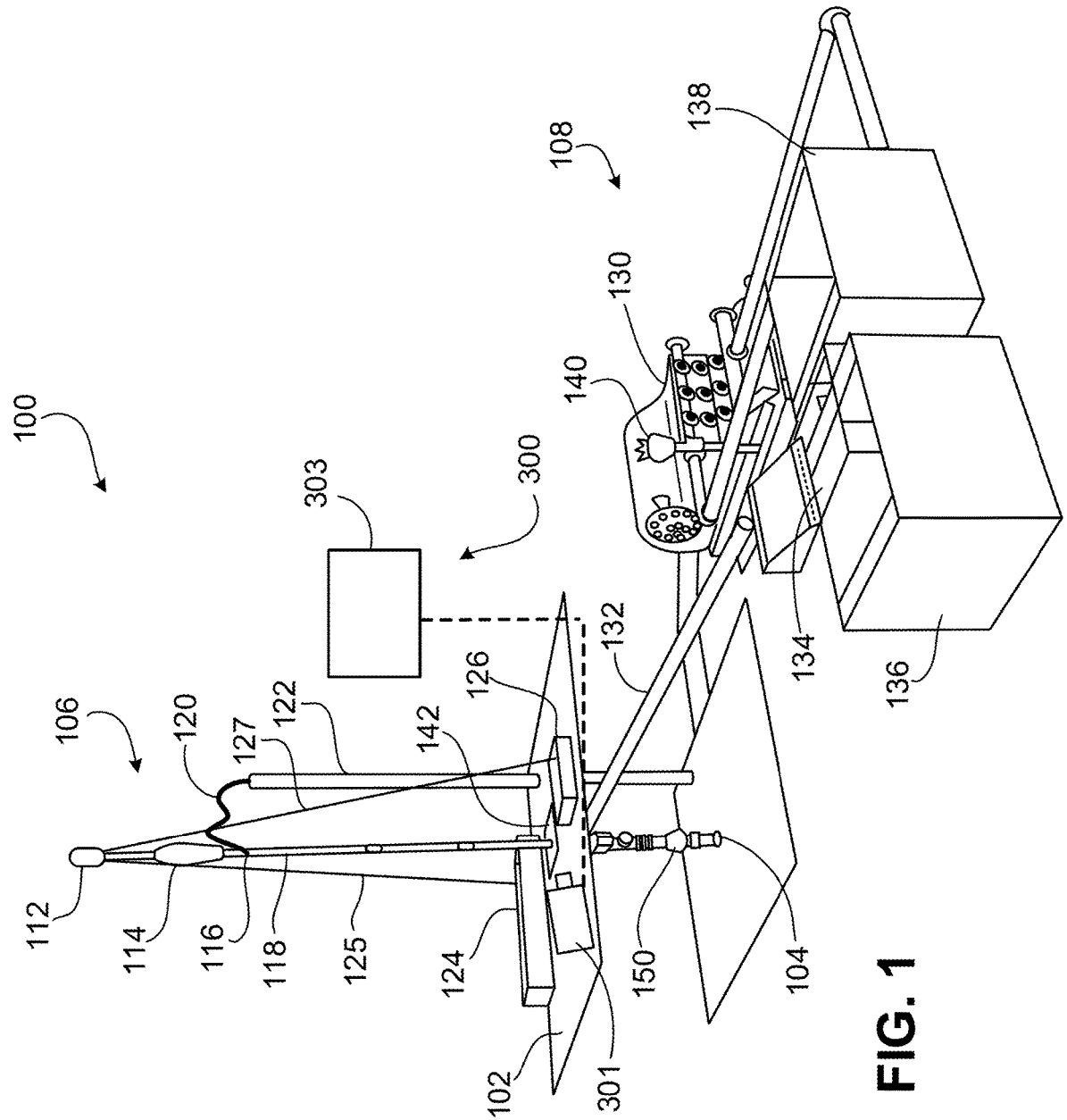
FIG. 1 is a schematic view of an example rig system for a well.

This disclosure describes intelligent monitoring, inspection, and control of well components on a rig, including an image-based inspection and analysis of well components and equipment for positive verification, dimensional analysis, identification of non-standard components, or other failure modes, which can lead to safer and more efficient operations. A monitoring system includes an image sensor and an onsite edge gateway positioned on a rig to monitor equipment and other well components. The well components that the monitoring system monitors can vary based on the target object of the image sensor, such as tools on a drill string, casing components, other well tools, or other well components on a rig. The image sensor, such as one or more cameras, is positioned about a rig and directed at a target component or group of components, and provides real-time image feed, such as images or video feed, to the gateway computing system located onsite at the rig. For example, the position of drill string tool joints can be monitored during drilling operations. If a tool joint (or other component) is positioned in a region of a closing blowout preventer (BOP), this position can reduce the probability of the BOP functioning correctly in the event that the BOP should be closed in response to a well incident. The methods and systems described here can be used to monitor the dynamic position of such drill string elements to enhance well control and safety. In some implementations, an automatic response includes integration of BOP command close functions and draw-works hoist control to prevent incorrect BOP closure. In some implementations, an automatic response includes moving the drill string to increase the probability of correctly and safely shutting in the well. The technologies described can take advantage of one or more of the following: automation, industrial Internet of Things (IOT), big data analytics, and artificial intelligence. The concepts described can also be applied to other areas of drilling operations, such as analysis of drill string dynamics, drilling fluid flow analysis, and formation cuttings analysis.

The gateway receives the image feed from the image sensor(s) and performs processing and analysis of the image feed to identify an operating parameter of the targeted well equipment. The gateway can determine an operating condition of the targeted well equipment based on the identified operating parameter. The gateway can propose, act on, or both propose and act on a fix based on the determined operating condition. The onsite edge gateway is an edge/fog gateway, in that the computing system components of the gateway that perform the analysis are located locally on the rig. For example, the onsite edge gateway can perform operations without having to transfer information and data or outsource analysis to a remote computing system in order to propose or act on a fix to a determined operating condition. Edge/fog computing can, in some respects, be advantageous to computing in a cloud environment. The cloud, which can cover a wider geographic area, can involve transfers of data from various sensors and devices, resulting in increased network traffic and in some cases add latency to the process. Edge/fog computing allows for a reduction in the number of switches and hosts between data sources and destinations and can reduce the time between data acquisition and smart analytics. Edge/fog computing can allow for quicker decision-making and interrogation of high frequency data that is typically not possible with cloud-type infrastructure. On top of this, the cloud can also introduce security and privacy concerns associated with the transfer of data. In contrast, most of the data in edge/fog computing is confined to the edge of a local network, and minimal data (if any) is transferred out of the local network. In cases where data needs to be transferred out of the local network, the edge/fog gateway can send, for example, only truncated, actionable information instead of all of the acquired data. This not only improves security and reduces privacy risks, but also reduces the bandwidth required for the transfer of data. This monitoring system is able to continuously monitor well components in real time. The monitoring system can perform continuous image and signal processing to extract operating parameter information. The monitoring system can identify operating conditions such as faults and anomalies in the well component. The monitoring system can propose a fix if the identified operating condition reaches a failure threshold of the well component. In the context of a highly dynamic environment (like drilling operations), it can be beneficial to make critical and time-sensitive decisions close to the operations. Edge/fog computing is a suitable fit for such dynamic applications.

In conventional drill rigs, inspection of drill string components or other components is performed by in-person visual inspection, or by non-destructive inspection, such as ultrasonic- or electromagnetic-based inspection. These inspections and orders can be time-consuming, ineffective, and prone to human error, which can lead to unplanned lost time and drilling costs. The monitoring system of the present disclosure provides real-time monitoring of well components using image sensors and advanced processing techniques. The monitoring system can identify failure modes of well components from the image feed of the image sensors. Based on the identified failure mode(s), the monitoring system can propose action item options to a well operator or actively act on an action item. For example, the monitoring system can propose an action item that addresses the failure mode, such as adjusting a position of the drill string, so that a blowout preventer of the well can be closed successfully and safely in response to a detection of a well kick. The monitoring system provides for synchronization of drilling operations and well control operations for seamless integration and predictive maintenance of well components on a rig. For example, the monitoring system monitors and can inspect the drill string, as well as the various instruments and equipment on a drilling rig and can utilize edge/fog computing-based smart analytics to streamline the relationship between drilling and well control. The monitoring system provides a network of dynamic, interlinked components that utilize smart sensors and smart devices to acquire data and actuators to respond to sensor information. The monitoring system can be used to facilitate data transfer between devices. The monitoring system can use machine learning and big data analytics to process, enrich, and present the data to initiate an automatic action or prompt an action to an operator.

FIG. 1 is a partial schematic perspective view of an example rig system 100 for drilling and producing a well. The well can extend from the surface through the Earth to one or more subterranean zones of interest. The example rig system 100 includes a drill floor 102 positioned above the surface, a wellhead 104, a drill string assembly 106 supported by the rig structure, a fluid circulation system 108 to filter used drilling fluid from the wellbore and provide clean drilling fluid to the drill string assembly 106, and a monitoring system 300 (including an image sensor 301 and an onsite edge gateway 303, and described in more detail later) to monitor in real time one or more components on the rig system 100. For example, the example rig system 100 of FIG. 1 is shown as a drill rig capable of performing a drilling operation with the rig system 100 supporting the drill string assembly 106 over a wellbore. The wellhead 104 can be used to support casing or other well components or equipment into the wellbore of the well.

The derrick or mast is a support framework mounted on the drill floor 102 and positioned over the wellbore to support the components of the drill string assembly 106 during drilling operations. A crown block 112 forms a longitudinally-fixed top of the derrick, and connects to a travelling block 114 with a drilling line including a set of wire ropes or cables. The crown block 112 and the travelling block 114 support the drill string assembly 106 via a swivel 116, a kelly 118, or a top drive system (not shown). Longitudinal movement of the travelling block 114 relative to the crown block 112 of the drill string assembly 106 acts to move the drill string assembly 106 longitudinally upward and downward. The swivel 116, connected to and hung by the travelling block 114 and a rotary hook, allows free rotation of the drill string assembly 106 and provides a connection to a kelly hose 120, which is a hose that flows drilling fluid from a drilling fluid supply of the circulation system 108 to the drill string assembly 106. A standpipe 122 mounted on the drill floor 102 guides at least a portion of the kelly hose 120 to a location proximate to the drill string assembly 106. The kelly 118 is a hexagonal device suspended from the swivel 116 and connected to a longitudinal top of the drill string assembly 106, and the kelly 118 turns with the drill string assembly 106 as the rotary table 142 of the drill string assembly turns.

Figure 2:
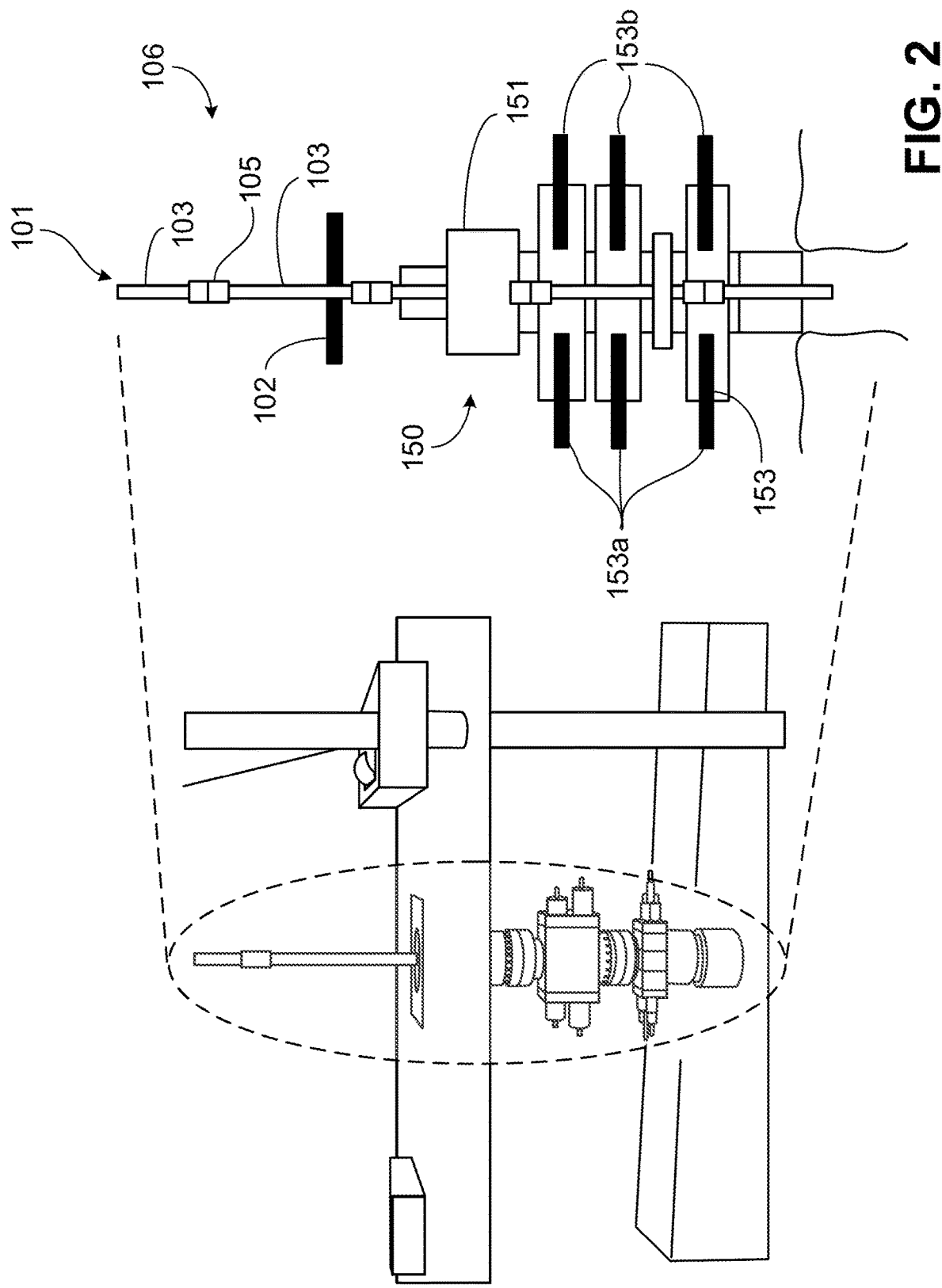
FIG. 2 is a partial schematic view of an example blowout preventer and drill string of the rig system of FIG. 1.

In the example rig system 100 of FIG. 1, the drill string assembly 106 is made up of drill pipes with a drill bit (not shown) at a longitudinally bottom end of the drill string. The drill string assembly 106 is described in more detail later, and a more detailed view is shown in FIG. 2. The drill pipe can include hollow steel piping, and the drill bit can include cutting tools, such as blades, dics, rollers, cutters, or a combination of these, to cut into the formation and form the wellbore. The drill bit rotates and penetrates through rock formations below the surface under the combined effect of axial load and rotation of the drill string assembly 106. In some implementations, the kelly 118 and swivel 116 can be replaced by a top drive that allows the drill string assembly 106 to spin and drill. The wellhead assembly 104 can also include a drawworks 124 and a deadline anchor 126, where the drawworks 124 includes a winch that acts as a hoisting system to reel the drilling line in and out to raise and lower the drill string assembly 106 by a fast line 125. The deadline anchor 126 fixes the drilling line opposite the drawworks 124 by a deadline 127, and can measure the suspended load (or hook load) on the rotary hook. The weight on bit (WOB) can be measured when the drill bit is at the bottom the wellbore. The wellhead assembly 104 also includes a blowout preventer 150 positioned at the surface 101 of the well and below (but often connected to) the drill floor 102. The blowout preventer 150 acts to prevent well blowouts caused by formation fluid entering the wellbore, displacing drilling fluid, and flowing to the surface at a pressure greater than atmospheric pressure. The blowout preventer 150 can close around (and in some instances, through) the drill string assembly 106 and seal off the space between the drill string and the wellbore wall. The blowout preventer 150 is described in more detail later.

During a drilling operation of the well, the circulation system 108 circulates drilling fluid from the wellbore to the drill string assembly 106, filters used drilling fluid from the wellbore, and provides clean drilling fluid to the drill string assembly 106. The example circulation system 108 includes a fluid pump 130 that fluidly connects to and provides drilling fluid to drill string assembly 106 via the kelly hose 120 and the standpipe 122. The circulation system 108 also includes a flow-out line 132, a shale shaker 134, a settling pit 136, and a suction pit 138. In a drilling operation, the circulation system 108 pumps drilling fluid from the surface, through the drill string assembly 106, out the drill bit and back up the annulus of the wellbore, where the annulus is the space between the drill pipe and the formation or casing. The density of the drilling fluid is intended to be greater than the formation pressures to prevent formation fluids from entering the annulus and flowing to the surface and less than the mechanical strength of the formation, as a greater density may fracture the formation, thereby creating a path for the drilling fluids to go into the formation. Apart from well control, drilling fluids can also cool the drill bit and lift rock cuttings from the drilled formation up the annulus and to the surface to be filtered out and treated before it is pumped down the drill string assembly 106 again. The drilling fluid returns in the annulus with rock cuttings and flows out to the flow-out line 132, which connects to and provides the fluid to the shale shaker 134. The flow line is an inclined pipe that directs the drilling fluid from the annulus to the shale shaker 134. The shale shaker 134 includes a mesh-like surface to separate the coarse rock cuttings from the drilling fluid, and finer rock cuttings and drilling fluid then go through the settling pit 136 to the suction pit 136. The circulation system 108 includes a mud hopper 140 into which materials (for example, to provide dispersion, rapid hydration, and uniform mixing) can be introduced to the circulation system 108. The fluid pump 130 cycles the drilling fluid up the standpipe 122 through the swivel 116 and back into the drill string assembly 106 to go back into the well.

The example wellhead assembly 104 can take a variety of forms and include a number of different components. For example, the wellhead assembly 104 can include additional or different components than the example shown in FIG. 1. Similarly, the circulation system 108 can include additional or different components than the example shown in FIG. 1.

FIG. 2 illustrates the tubular 101 in relation to the blowout preventer 150 at the top of the well. The tubular 101 can include multiple tubular sections 103 that are connected end-to-end by connections 105 (for example, welded connections, threaded connections, joint connections, or combinations of these). As one example, the tubular 101 can be a part of a drill string assembly, the tubular sections 103 can be drill pipes, and the connections 105 can be tool joints connecting the drill pipes together. The tubular 101 can be run into or out of the well through the blowout preventer 150.

The following description describes the systems and methods as they are applicable to the operation of running the tubular 101 into the well, but it should be appreciated that the systems and methods can also optionally be applied to the operation of running the tubular 101 out of the well. The blowout preventer 150 is a valve (or assembly of valves) at the top of the well that can be closed to seal the well to prevent a blowout, which is an uncontrolled release of formation fluid from the well. The blowout preventer 150 can include multiple blowout preventer valves. For example, the blowout preventer 150 can include one or more annular blowout preventers 151, one or more ram blowout preventers 153, or combinations of both.

Each annular blowout preventer 151 can be a doughnut-shaped rubber seal that can close around a variety of tubular 101 sizes to prevent flow out of the annulus between the tubular 101 and a casing (or openhole). Even while closed, the annular blowout preventer 151 can allow rotation and movement of the tubular 101 without breaking the seal. Typically, the blowout preventer 150 includes at least one annular blowout preventer 151 at the top and one or more ram blowout preventers 153 below the annular blowout preventer 151 (as shown in FIG. 2).

Each ram blowout preventer 153 can include two halves 153a and 153b (often called rams or ram blocks) that can be forced together to seal the well. The ram blocks (153a, 153b) can be forced together by the use of hydraulic cylinders. The ram blocks 153a and 153b can be constructed of steel and fitted with elastomer components on their respective sealing surfaces. The ram blocks 153a and 153b can be provided in a variety of configurations. For example, in the case of open wellbores, the ram blocks 153a and 153b can be flat at the mating surfaces. In some implementations, the ram blocks 153a and 153b are designed to have a circular cutout in the middle that corresponds to the diameter of the tubular 101 being run in the well so as to be able to seal the well when the tubular 101 is in the hole, or to hand the tubular 101 off the closed ram blocks 153a and 153b. In some implementations, the ram blocks 153a and 153b are operable to shear the tubular 101, where the ram blocks 153a and 153b are fitted with reciprocal tool steel-cutting surfaces to enable them upon closing to shear through the tubular 101 and seal the well after severing the tubular 101.

In cases where the blowout preventer 150 needs to be closed to prevent uncontrolled release of formation fluid from the well, it is desirable that components of the blowout preventer 150 that close around or through the tubular 101 avoid the connections 105 or other non-compliant shapes or sizes. For example, in the case that the tubular 101 is part of a drill string, and the connections 105 are tool joints, it is desirable that the closing component(s) of the blowout preventer 150 (such as the ram blocks 153a and 153b) are not in line with any of the tool joint connections 105, so that the risk of the blowout preventer 150 unsuccessfully sealing or shearing the tubular 101 is mitigated or eliminated. In the example shown in FIG. 2, it would be acceptable to close the top two ram blowout preventers 153, but closing the bottom ram blowout preventer 153 could be undesirable, as the ram blocks 153a and 153b of the bottom ram blowout preventer 153 are in line with the bottom tool joint connection 105. The systems and methods described in this disclosure can be used to determine such conditions (for example, alignment of ram blocks 153a and 153b with a connection 105) and prevent undesirable results (for example, closing the ram blocks 153a and 153b around or through the connection 105) or bring the tubular 101 out of such conditions (for example, by moving the tubular, such that none of the connections 105 are in line with any of the ram blocks 153a and 153b). In some implementations, the analysis and response can be fully automated by the monitoring system 300 in response to a request to shut in (that is, close) the blowout preventer 150. The automated response can allow for quick, safe, and successful shut in of the well.

Figure 3A:
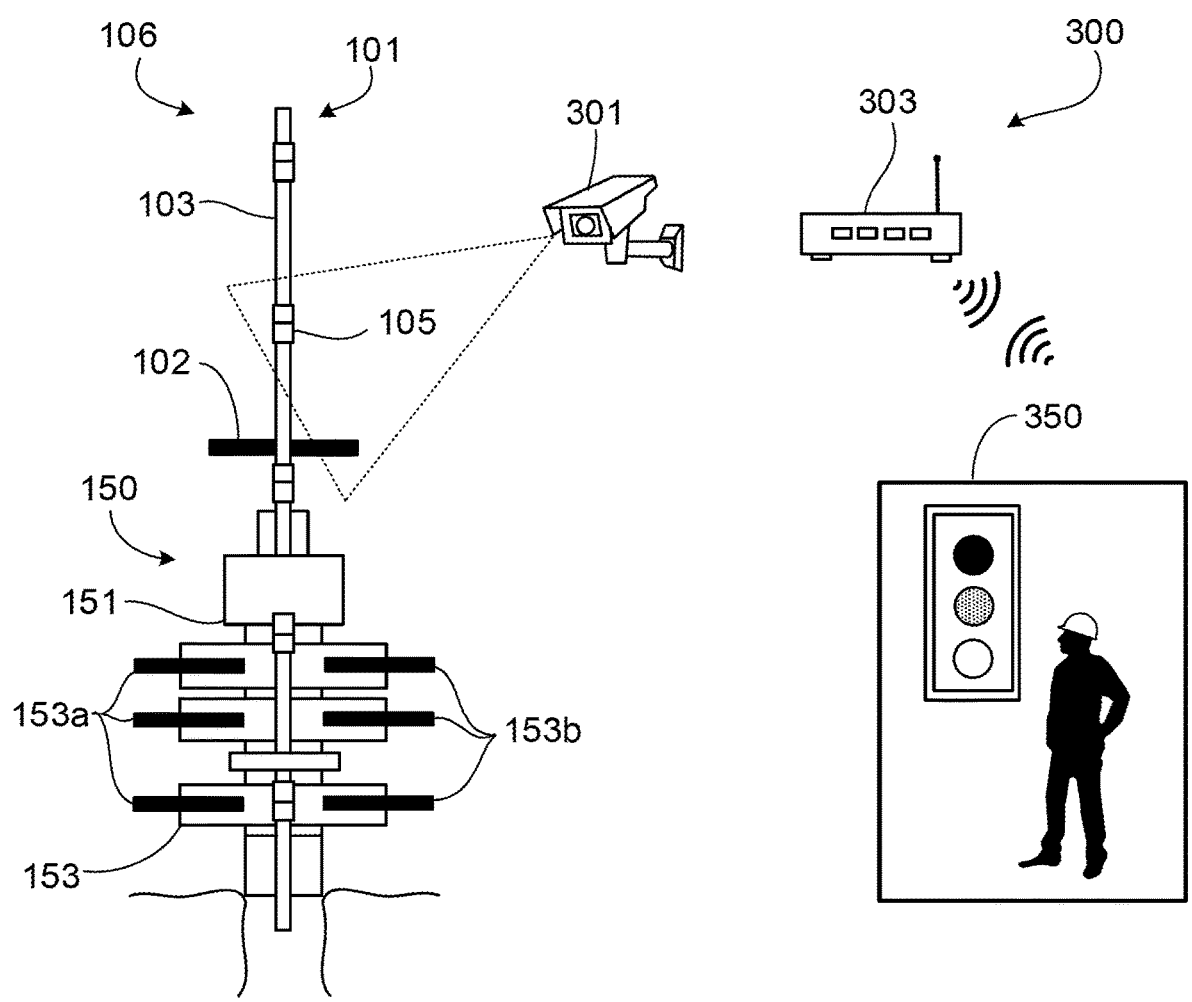
FIG. 3A is a schematic view of an example monitoring system for the rig system of FIG. 1.

The rig system 100 shown in FIG. 1 can include the monitoring system 300 that monitors a component of the drill string assembly 106. Referring to FIG. 3A, the monitoring system 300 can be used to monitor the tubular 101 being run into the well. The monitoring system 300 includes an image sensor 301 (for example, a camera) that can capture one or more images or videos of the tubular 101 being run into the well. The image sensor 301 can provide the captured one or more images or videos as an image feed. The image sensor 301 is communicatively coupled to an onsite edge gateway 303 that is local to the image sensor 301 (that is, located in proximity to the image sensor 301). In some implementations, the image sensor 301 can wirelessly communicate with the onsite edge gateway 303, for example, by Bluetooth®, Wi-Fi™, ZigBee, cellular, or near-field communication (NFC). In some implementations, the image sensor 301 can be communicatively coupled to the onsite edge gateway 303 by a wired connection. The onsite edge gateway 303 can be configured to receive and process the image feed from the image sensor 301.

The image sensor 301 can provide component detection and can capture an image feed of the component during staging or operation of the component. The image sensor 301 can take a variety of forms. For example, the image sensor 301 can include a camera, such as a camera that is smart, waterproof, high-resolution, wireless, or a combination of these features. For example, the image sensor 301 can include a charge-coupled device (CCD) camera, a machine vision camera, a CCD machine vision camera, a digital camera, an infrared camera, an x-ray camera, a thermal camera, an acoustic camera, an ultraviolet camera, an ultrasonic imaging camera, a magnetic resonance imaging (MM) camera, a point cloud scanner, a laser scanner, a Lidar scanner, or a combination of these. In some instances, the image sensor 301 includes an optical filter, such as an ultraviolet (UV) filter, infrared (IR) filter, or a combination of these, or another filter type. In some implementations, the image sensor 301 can have a resolution that is sufficient for identifying components or deficiencies with sizes on the order of approximately 50 micrometers. The image sensor 301 is a non-invasive image capture of the component and provides the image feed to the gateway 303. While the monitoring system 300 of FIG. 3A shows only one image sensor 301, the monitoring system 300 can include more than one image sensor, such as a plurality of cameras positioned about the drill string component. In some implementations, a plurality of image sensors can provide an image feed that represents a three-dimensional model of the component to the gateway 303. For example, multiple image sensors 301 can be positioned evenly or unevenly about a component to provide an image feed to the gateway 303 representative of a three-dimensional view of the component. For example, multiple image sensors 301 can be at different positions and angles to provide an image feed to the gateway 303 representative of a three-dimensional view of the component. The image sensor 301 can be disposed anywhere about the rig system 100, given that the image sensor 301 is directed at the component to provide an image feed of the component. In some implementations, the image sensor 301 is mounted on a movable support that can move and position the image sensor 301, for example, to follow a particular component over multiple views or during movement of the component, switch from one component to another, or a combination of these.

In some implementations, the monitoring system 300 includes an audio sensor in addition to or instead of the image sensor 301. The audio sensor can capture audio and provide an audio feed to the gateway 303. In some implementations, the onsite edge gateway 303 can process the audio feed from the audio sensor in conjunction with the image feed from the image sensor(s) 301 to identify one or more properties or components of the drill rig (for example, the tubular 101 being run into the well).

The onsite edge gateway 303 is positioned onsite, or locally, on the rig, and acts as an edge/fog computing system. In other words, the onsite edge gateway 303 includes computing components located onsite, in that the computing components that perform the analysis of the image feed from the image sensor(s) 301 are located locally on the rig. This edge/fog computing setup of the gateway 303 localizes processing and analysis at the gateway 303, for example, without need for transferring information and data or outsourcing analysis to a remote computing system in order to function. The gateway 303 includes one or more processors and a computer-readable storage medium used in the reception and analysis of the input from the image sensor 301, as described in more detail later. For example, the onsite edge gateway 303 can be a computer, a processing board, a programmable logic gateway, an edge/fog computer, or any suitable computing device with input and output capabilities.

The image sensor 301 provides the image feed of the one or more well components to the onsite edge gateway 303, and the gateway 303 identifies present or potential failures in the integrity, position, or dimension of the component(s). For example, the onsite edge gateway 303 can determine an elevation of a connection 105 of the tubular 101, relative to a reference elevation of the well (for example, the reference elevation of the well can be the elevation of the drill floor or a wellhead). In some implementations, the reference elevation does not need to be visible in the one or more images captured by the image sensor 301. For example, the onsite edge gateway 303 can be input with data or calibrated to data that includes known information, such as a known elevation of the image sensor 301 relative to the reference elevation, a known distance of the image sensor 301 from the tubular 101, or another reference point that is a known distance away from the reference elevation. The gateway 303 can also propose (and in some instances, act on) a fix or reaction for the identified condition of the component(s), all in real time. Real time, for example, can mean that the image feed is provided continuously and instantaneously from the image sensor 301 to the gateway 303, and the identification and determination of a particular operating parameter, operating condition, and failure mode of a feature of the component occurs instantaneously.

The onsite edge gateway 303 receives the image feed from the image sensor(s) 301 and is configured to process and analyze the one or more images captured by the image sensor 301 in order to identify one or more properties or components of the drill rig (for example, the tubular 101 being run into the well). The processing and analysis of the image feed can include identifying an operating parameter of the targeted well component, generating an operating condition of the well component from the operating parameter, and in some instances, determining that the operating condition meets a failure threshold of the component, a nearby component, or the system. The failure threshold can include, for example, a minimum distance threshold between a drill string tool joint and a BOP. Based on this determination, the gateway 303 can prompt an automation rule. The automation rule can vary and can include sending a signal or instructions to drive a controllable device, as described in greater detail later. In some instances where the operating condition of the component meets a failure threshold, the gateway 303 can propose, act on, or both propose and act on a proactive, preventative action.

The image processing can include, for example, preprocessing, image enhancement, image segmentation, feature extraction, image classification, target detection, pattern recognition, edge detection, wavelets, pixelation, texture, connectivity component based approach, principle and independent component analysis, descriptors-based method, linear filtering, anisotropic diffusion, grey-level segmentation, thresholding method, machine learning, artificial intelligence, spatial domain filtering, frequency domain filtering, or combinations of these. In some implementations, the image processing includes comparing the captured image(s) to a standard or model.

The well component that the monitoring system 300 inspects can vary, for example, based on the target object of the image sensor 301. In relation to the example rig system of FIG. 1, the image sensor 301 can be directed at a component of the drill string assembly 106, such as the drill pipe. However, the image sensor 301 can be directed at and provide an image feed of a different component of the drill string assembly 106, or of another component on the rig system 100. For example, the well component can include drill pipes, drill pipe connections (such as tool joints), drill pipe collars, heavyweight drill pipes and collars, cross over subs, tubulars, stabilizers, packers, drilling jars, downhole motors, reamers, drill bits, drill bit subs, casing components such as casings, liners, casing collars, and casing centralizers, or a combination of these components, or other components. In some examples, the image sensor 301 is directed at a component of the rig system 100, such that the monitoring system 300 inspects and monitors the integrity of a component of the rig system 100 during operation of the rig system 100.

In some implementations, the onsite edge gateway 303 is configured to distinguish the connections 105 from the tubular sections 103 of the tubular 101 based on the one or more images captured by the image sensor 301. For example, the onsite edge gateway 303 can implement object detection to identify the connections 105. For example, in cases where the connections 105 have a different outer diameter than the tubular sections 103 (which is typical for tool joint connections 105 connecting together drill pipe tubular sections 103), the onsite edge gateway 303 can process the one or more images from the image sensor 301 and identify the connections 105 based on the different outer diameter of the connections 105 in comparison to the tubular sections 103. In some implementations, the onsite edge gateway 303 can be calibrated to detect a certain property that corresponds to the connection 105 (for example, a characteristic outer diameter or color) to identify the connections 105 of the tubular 101. In some implementations, the onsite edge gateway 303 is configured to detect dynamic features, such as vibration of the tubular 101 as the tubular 101 is run into or removed from the well. To ensure accurate monitoring, it may be desirable that the image sensor 301 is positioned and angled in such a manner that at least one connection 105 (or other characteristic corresponding to the connections 105) is visible to the image sensor 301 at all times while the tubular 101 is being run into the well.

Based on the determined elevation of the connection 105 relative to the reference elevation of the well, the onsite edge gateway 303 is configured to generate an operating condition and determine whether an automation rule includes the operating condition. For example, the operating condition can be an alignment position of the connection 105 relative to the blowout preventer 150, and the automation rule can be the condition in which the connection 105 is aligned with the blowout preventer 150. The onsite edge gateway 303 can be configured to determine the alignment position, for example, based on a known elevation of the blowout preventer 150 relative to the reference elevation of the well and the determined elevation of the connection 105 relative to the reference elevation of the well. The alignment position of the connection 105 relative to the blowout preventer 150 can be an alignment position of the connection 105 relative to the rams 153a and 153b of the ram blowout preventer 153. In some implementations, the automation rule is a comparison of the operating condition to a threshold value. If the operating condition is within or equal to the threshold value, the automation rule can be considered to not include the operating condition. If the operating condition exceeds the threshold value, the automation rule can be considered to include the operating condition, and an appropriate action should be initiated in response. For example, if the onsite edge gateway 303 determines that one of the tool joints 105 is within 1 foot (an example of a threshold "vicinity" value) of being aligned with any one of the ram blowout preventers 153, then the operating condition is determined to be within the automation rule.

If the onsite edge gateway 303 determines that the operating condition is included in the automation rule (for example, the alignment position of the connection 105 relative to the blowout preventer 150 is such that the connection 105 is aligned with the blowout preventer 150), the onsite edge gateway 303 is configured to transmit a signal to drive a controllable device in a remote location (for example, a control panel 350 located in a control room). For example, the signal can cause the control panel 350 to display a warning to an operator that the blowout preventer 150 is not in a desirable condition for closing. The operator can then take action, for example, to adjust the position of the tubular 101 or close only the specific components of the blowout preventer 150 that are in desirable condition for closing. In some implementations, the onsite edge gateway 303 can do the decision making and automatically initiate a response. For example, the signal transmitted by the gateway 303 can cause the control panel 350 to transmit another signal to automatically adjust the position of the tubular 101 (or adjust the running speed of the tubular 101), such that the connection 105 is no longer aligned with the blowout preventer 150. For example, the signal transmitted by the gateway 303 can directly cause a running system (that is running the tubular 101 into the well) to adjust its speed, such that the connection 105 is no longer aligned with the blowout preventer 150.

In some implementations, if the onsite edge gateway 303 determines that the alignment position of the connection 105 relative to the blowout preventer 150 is such that the connection 105 is not aligned with the blowout preventer 150, the onsite edge gateway 303 can transmit a signal to cause the control panel 350 to display a "green light" to an operator, the green light representing that the blowout preventer 150 is in condition for closing without risk of the blowout preventer 150 closing around or through the connection 105. In some implementations, the onsite edge gateway 303 can do the decision making and automatically initiate a response. For example, if the onsite edge gateway 303 determines that the blowout preventer 150 is in desirable condition for closing, the gateway 303 can transmit a signal that automatically closes the blowout preventer 150 in response to a well shut in request.

As shown in FIG. 3A, the blowout preventer 150 can include multiple ram blowout preventers 153 and multiple connections 105, and the onsite edge gateway 303 can do the applicable determinations for each of the connections 105 in relation to each of the ram blowout preventers 153. For example, in FIG. 3A, the bottom-most connection 105 is aligned with the bottom-most ram blowout preventer 153 but not aligned with the other two ram blowout preventers 153. The onsite edge gateway 303 can determine this configuration and provide a signal representing this condition to the control panel 350. In some implementations, the signal can cause the control panel 350 to display a warning to an operator that the bottom-most ram blowout preventer 153 is not in a desirable condition for closing even though the other two ram blowout preventers 153 are. The operator can then choose to close one or both of the other two ram blowout preventers 153 while leaving the bottom-most ram blowout preventer 153 open. In some implementations, the onsite edge gateway 303 can continue monitoring the tubular 101 being run into the well and once the onsite edge gateway 303 determines that none of the ram blowout preventers 153 are aligned with any of the connections 105, the onsite edge gateway 303 can transmit a signal to cause the control 350 to display a "green light" to an operator. The operator can then choose to close any of the ram blowout preventers 153. In some implementations, the signal can cause the control panel 350 to automatically adjust the position of the tubular 101 (or adjust the running speed of the tubular 101), such that none of the connections 105 are aligned with any of the ram blowout preventers 153. In some implementations, the signal can be transmitted to one or more actuators (which can be binary or continuous) that can perform or initiate an action (such as adjust the position of the tubular 101) when actuated. Some non-limiting examples of actuators include pneumatic, electrical, electromagnetic, electromechanical, micro-, and nano-actuators.

In some implementations, the onsite edge gateway 303 can be configured to determine a running speed of the tubular 101 being run into the well. For example, the onsite edge gateway 303 can process two images captured by the image sensor 301 to determine the distance a reference point (for example, the connection 105) has moved between the instances of capturing the two images. Based on the distance and the time between capturing the two images, the onsite edge gateway 303 can determine the running speed of the tubular 101 being run into the well. In some implementations, an expected running speed of the tubular 101 can be input to the onsite edge gateway 303, and the onsite edge gateway 303 can compare the determined running speed with the expected running speed of the tubular 101 to verify that the tubular 101 is being run into the well as planned. In the case that the difference between the expected running speed and the determined running speed of the tubular 101 exceeds a threshold running speed difference tolerance value, the onsite edge gateway 303 can transmit a warning signal to the control panel 350 to alert an operator that the tubular 101 is being run into the well at a speed that is not according to plan. In some implementations, the onsite edge gateway 303 can transmit a signal to automatically adjust the running speed of the tubular 101, such that the difference between the expected running speed and the determined running speed 101 decreases to be within the threshold running speed difference tolerance value.

An operator in a control room may decide that the blowout preventer 150 should be closed (for example, because a kick has been detected). The operator can use the control panel 350 to send a signal to the onsite edge gateway 303 signifying that the blowout preventer 150 is to be closed. In some implementations, the onsite edge gateway 303 (in response to receiving the signal signifying that the blowout preventer 150 is to be closed) can be configured to determine whether the blowout preventer 150 is in a desirable condition for closing (for example, none of the connections 105 are aligned with any of the ram blowout preventers 153) based on the determined one or more elevations of the connections 105 and the determined (or inputted) running speed of the tubular 101. If the onsite edge gateway 303 determines that the blowout preventer 150 is in a desirable condition for closing, the onsite edge gateway 303 can be configured to automatically close the blowout preventer 150 (for example, the onsite edge gateway 303 can transmit a signal to the blowout preventer 150 to close the annular blowout preventer 151 and one or more of the ram blowout preventers 153).

In the case that the onsite edge gateway 303 determines that the blowout preventer 150 is not in a desirable condition for closing, the onsite edge gateway 303 can be configured to implement one or more of the following actions. The onsite edge gateway 303 can be configured to determine the next instance in which the blowout preventer 150 will be in a desirable condition for closing (for example, determine the time it will take for the tubular 101 being run into the well to be in a position where none of the connections 105 are aligned with any of the ram blowout preventers 153) based on the determined one or more elevations of the connections 105 and the determined (or inputted) running speed of the tubular 101. The onsite edge gateway 303 can be configured to wait until the determined next instance in which the blowout preventer will be in the desirable condition for closing and then automatically close the blowout preventer 150.

In some cases, there is not enough time to wait for the blowout preventer 150 to get to the desirable condition for closing. In such cases, the onsite edge gateway 303 can be configured to determine an adequate position adjustment of the tubular 101 that puts the blowout preventer 150 in the desirable condition for closing. The adequate position adjustment can be determined based on the determined one or more elevations of the connections 105 and the determined (or inputted) running speed of the tubular 101. The position adjustment can include increasing the running speed of the tubular 101 into the well or decreasing the running speed of the tubular 101. The onsite edge gateway 303 can be configured to automatically move the tubular 101 according to the determined adequate position adjustment (for example, the onsite edge gateway 303 can transmit a signal to cause the tubular 101 to move according to the determined adequate position adjustment). Once the position of the tubular 101 in relation to the blowout preventer 150 puts the blowout preventer 150 in the desirable condition for closing, the onsite edge gateway 303 can be configured to stop the running of the tubular 101 into or out of the well (for example, the onsite edge gateway 303 can transmit a signal to cause the mechanism by which the tubular 101 is run into the well to be stopped).

In some implementations, the onsite edge gateway 303 can be configured to determine whether the tubular 101 is being run into the well in an uncontrolled manner. For example, the onsite edge gateway 303 can detect if the tubular 101 is being run into the well at a speed that is different from an expected running speed. In response to determining that the tubular 101 is being run into the well in an uncontrolled manner, the onsite edge gateway 303 can be configured to automatically perform operations to mitigate the possibility of harmful results. For example, the onsite edge gateway 303 can be configured to automatically reduce the running speed of the tubular 101 being run into the well. For example, the onsite edge gateway 303 can be configured to shut off the running tool being used to run the tubular 101 into the well. For example, the onsite edge gateway 303 can be configured to close the blowout preventer 150 (as described previously).

Figure 3B:
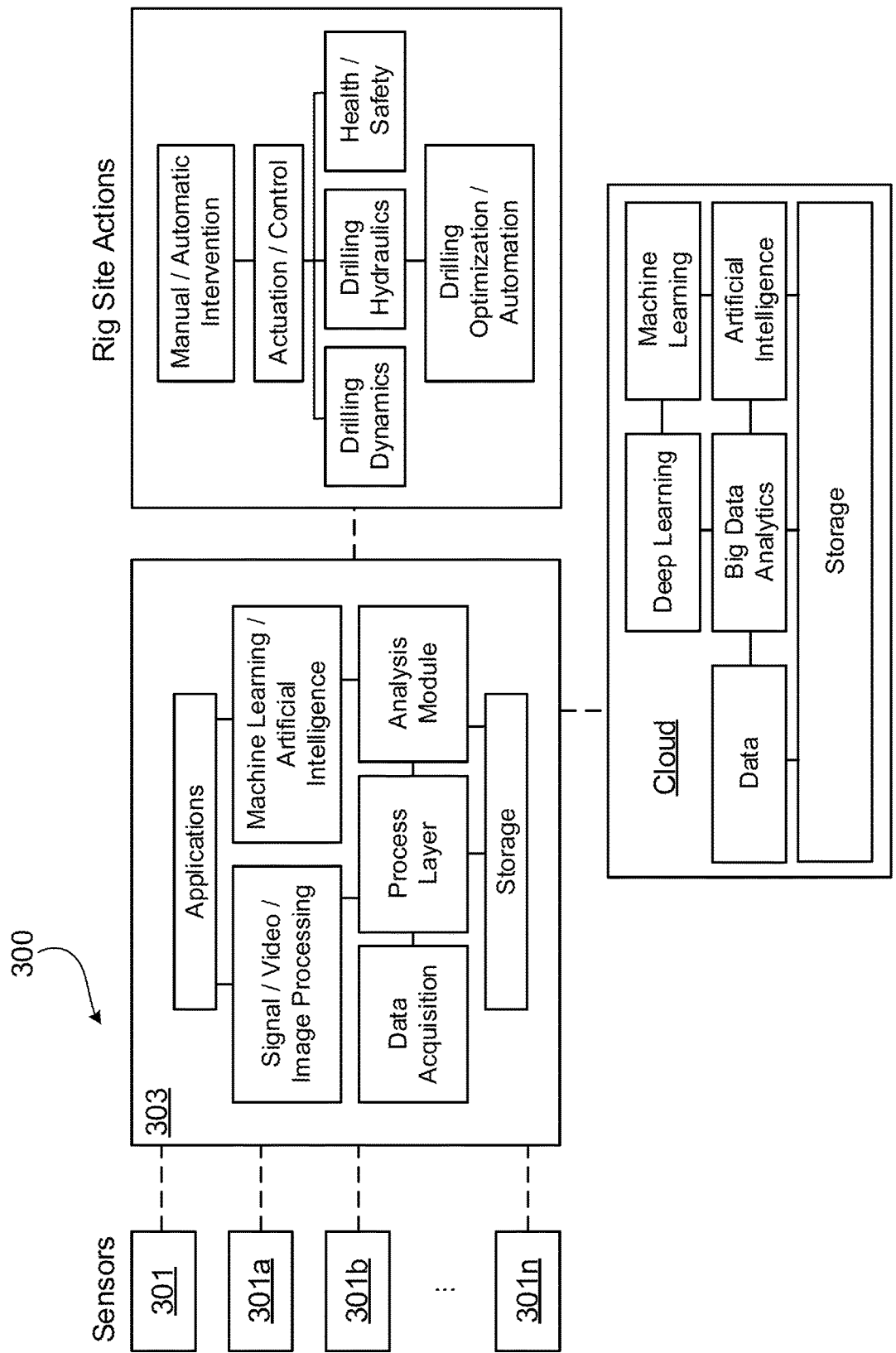
FIG. 3B is a block diagram illustrating an example monitoring system for the rig system of FIG. 1.

FIG. 3B illustrates another example of the monitoring system 300. As mentioned previously, the monitoring system 300 includes the image sensor 301 and the onsite edge gateway 303. The monitoring system 300 can include additional sensors (such as sensors 301*a*, 301*b*, 301*n*). The additional sensors (for example, sensor 301*a*) can include one or more additional image sensors, one or more audio sensors, one or more heat sensors, one or more vibration sensors, or any combination of these. Each of the additional sensors (for example, sensors 301*a* and 301*b*) can be located on the rig, for example, above the surface or downhole (that is, within the wellbore). One or more of the sensors (301, 301*a*, 301*b*, . . . , 301*n*) can be wirelessly connected to the onsite edge gateway 303. In some implementations, all of the sensors are wirelessly connected to the onsite edge gateway 303.

The onsite edge gateway 303 can include one or more applications that can be run to cause the gateway 303 to perform various operations. The onsite edge gateway 303 can acquire data from the one or more sensors (for example, the image sensor 301 and one or more of the additional sensors 301*a*, 301*b*, etc.), and the data can be sent to a process layer, where one or more processing operations can be performed. For example, the processing operations in the process layer can include analog signal processing, digital signal processing, image/video processing, pattern recognition, edge detection, wavelet transform processing, pixelated processing, texture processing, component-based approach connectivity operations, principal component analysis, independent component analysis, descriptors based methods, linear filtering, anisotropic diffusion operations, grey-level segmentation, image thresholding, spatial domain filtering, frequency domain filtering, or any combination of these operations. The processed data from the process layer can be sent to an analysis module. The analysis module can perform one or more analysis operations. For example, the analysis operations in the analysis module can include machine learning algorithms or artificial intelligence algorithms, for example, based on detection, failure, or prediction models. Such algorithms can be based on data-driven models, physics models, or models that are both physics- and data-driven. The analysis operations are performed to identify patterns in the data. Predictions can be made from the identified patterns to mitigate or prevent problems, for example, associated with incorrect tubular 101 positioning or spacing of tool joints relative to the blowout preventer 150. The acquired data, processed data, results from the processing operations, results from the analysis operations, or a combination of these can be stored on the onsite edge gateway 303.

The onsite edge gateway 303 can communicate with and actuate other components of the rig system 100. For example, the onsite edge gateway 303 can automatically initiate an intervention action on the rig system 100 or provide a notification to an operator to instruct the operator to perform a manual intervention action on the rig system 100. The onsite edge gateway 303 can transmit a signal to actuate a component of the rig system 100 (for example, raise an alarm or close a valve). The onsite edge gateway 303 can transmit a signal to initiate drilling dynamics operations or measurements. The onsite edge gateway 303 can transmit a signal to initiate, change, or stop drilling hydraulics operations or measurements. The onsite edge gateway 303 can transmit a signal to raise a warning, an alarm, trip a safety mechanism, or trigger another health and safety-related action. The onsite edge gateway 303 can transmit a signal to improve drilling optimization, automation, or both. For example, the onsite edge gateway 303 can provide a parameter used in drilling optimization, automation, or both. In some implementations, one or more parameters can be transmitted to the onsite edge gateway 303 from one or more components of the rig system 100 to improve operations and calculations performed by the onsite edge gateway 303. All operations and calculations performed by the onsite edge gateway 303 occur locally on the rig.

In some implementations, the onsite edge gateway 303 can be communicatively coupled to a cloud. The cloud can be used to store data acquired by the onsite edge gateway 303. The cloud can be used to store large amounts of data, for example, terabytes of data. Various operations can be performed in the cloud separately from the onsite edge gateway 303. For example, deep learning algorithms, machine learning algorithms, artificial intelligence algorithms, big data analytics, or any combination of these can be performed in the cloud. In some implementations, one or more optimization parameters can be determined by any one or more of such operations, and the one or more optimization parameters can be transmitted to the onsite edge gateway 303 to improve operations and calculations performed by the onsite edge gateway 303. The operations performed in the cloud need not occur locally on the rig.

FIGS. 4A, 4B, and 4C illustrate a progression of the tubular 101 being run into the well. In FIG. 4A, one of the connections 105 of the tubular 101 is aligned with the top-most ram blowout preventer 153, while the other two ram blowout preventers 153 are not aligned with any of the connections 105. The onsite edge gateway 303 (not shown in this figure) can determine this configuration and transmit a signal, for example, to the control panel 350 in a remote location that represents this configuration. For example, the signal can cause the control 350 to display a representation of the configuration to an operator that shows the top-most ram blowout preventer 153 is not in condition for closing, while the other two ram blowout preventers 153 are.

In FIG. 4B, one of the connections 105 of the tubular 101 is aligned with the middle ram blowout preventer 153, while the other two ram blowout preventers 153 are not aligned with any of the connections 105. The onsite edge gateway 303 (not shown in this figure) can determine this configuration and transmit a signal, for example, to the control panel 350 in a remote location that represents this configuration. For example, the signal can cause the control 350 to display a representation of the configuration to an operator that shows the middle ram blowout preventer 153 is not in condition for closing, while the other two ram blowout preventers 153 are.

In FIG. 4C, one of the connections 105 of the tubular 101 is aligned with the bottom-most ram blowout preventer 153, while the other two ram blowout preventers 153 are not aligned with any of the connections 105. The onsite edge gateway 303 (not shown in this figure) can determine this configuration and transmit a signal, for example, to the control panel 350 in a remote location that represents this configuration. For example, the signal can cause the control 350 to display a representation of the configuration to an operator that shows the bottom-most ram blowout preventer 153 is not in condition for closing, while the other two ram blowout preventers 153 are.

Figure 5:
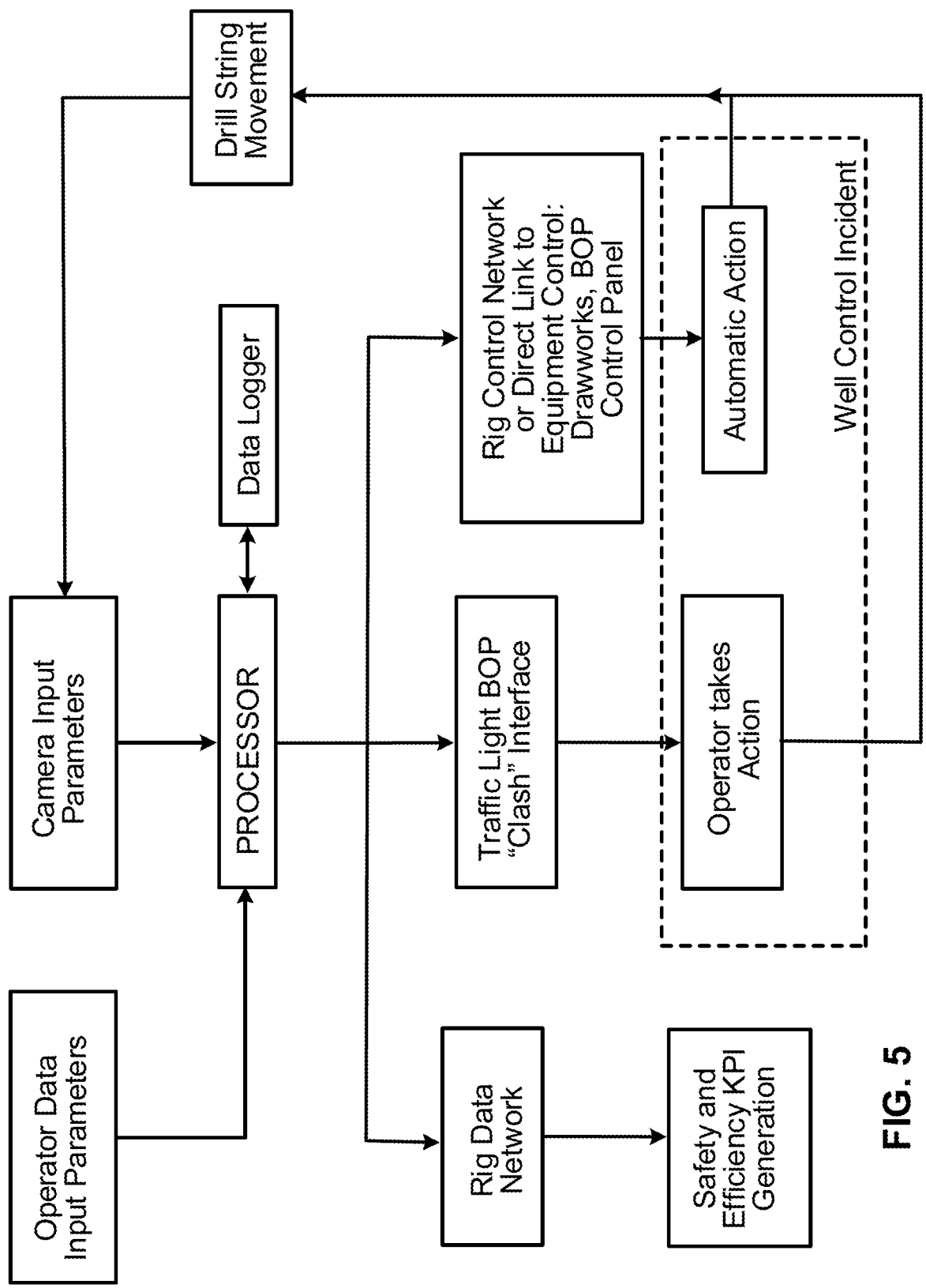
FIG. 5 is a flow chart of an example control loop of an example onsite edge gateway of the monitoring system of FIG. 3A.

FIG. 5 is a block diagram that illustrates an example of the various inputs, outputs, and functions of the onsite edge gateway 303. The onsite edge gateway 303 can accept as input operator data input parameters, camera input parameters, data from a data log, and images from the image sensor 301. Although not shown, the onsite edge gateway 303 can optionally accept additional data as input, such as audio data from an audio sensor. In some implementations, operator input is considered a "low frequency" data type, in which the data input can change, for example, less than once per day on average. Some non-limiting examples of operator data input parameters include expected running speed of the tubular 101 into the well (or a minimum expected running speed, a maximum expected running speed, or both), dimensions of the tubular 101 (which can include dimensions of the tubular sections 103, the connections 105, or a combination of both), dimensions of the blowout preventer 150 (which can include dimensions of the components of the blowout preventer 150), dimensions and operating characteristics of the rotary table 142, rig system 100 operating and design parameters (such as maximum running speed and casing shoe depth), and threshold tolerance values. In some implementations, camera input is considered a "high frequency" data type, in which the data input can change, for example, once every five seconds, once every second, or faster. Some non-limiting examples of camera input parameters include elevation of the image sensor 301 relative to the reference elevation of the well, distance of the image sensor 301 from the tubular 101, distance of a reference point from the image sensor 301, elevation of the blowout preventer 150 relative to the reference elevation of the well (which can include the relative elevation(s) of the one or more annular blowout preventers 151, the relative elevation(s) of the one or more ram blowout preventers 153, or a combination of both), and calibration data.

The onsite edge gateway 303 can process the input data and generate output data. Some non-limiting examples of output data include deviations of an actual drilling operation from an expected drilling operation, drilling log data, raw data received from another device (such as image data captured by the image sensor 301), processed data (such as the results of image processing of the image data captured by the image sensor 301), detected vibration of the tubular 101, a signal representing the configuration of the tubular 101 (and its connections 105) with respect to components of the blowout preventer 150 (such as alignment of any one of the connections 105 with the ram blocks 153*a* and 153*b* of any one of the ram blowout preventers 153), and a signal to trigger an actuator based on detected operating conditions meeting an operating criteria.

In some implementations, an operator takes action in response to the output of the onsite edge gateway 303. In some implementations, the output of the onsite edge gateway 303 automatically causes an action to initiate (for example, the onsite edge gateway 303 transmits a signal directly to an actuator to adjust a position of the tubular 101).

Figure 6:
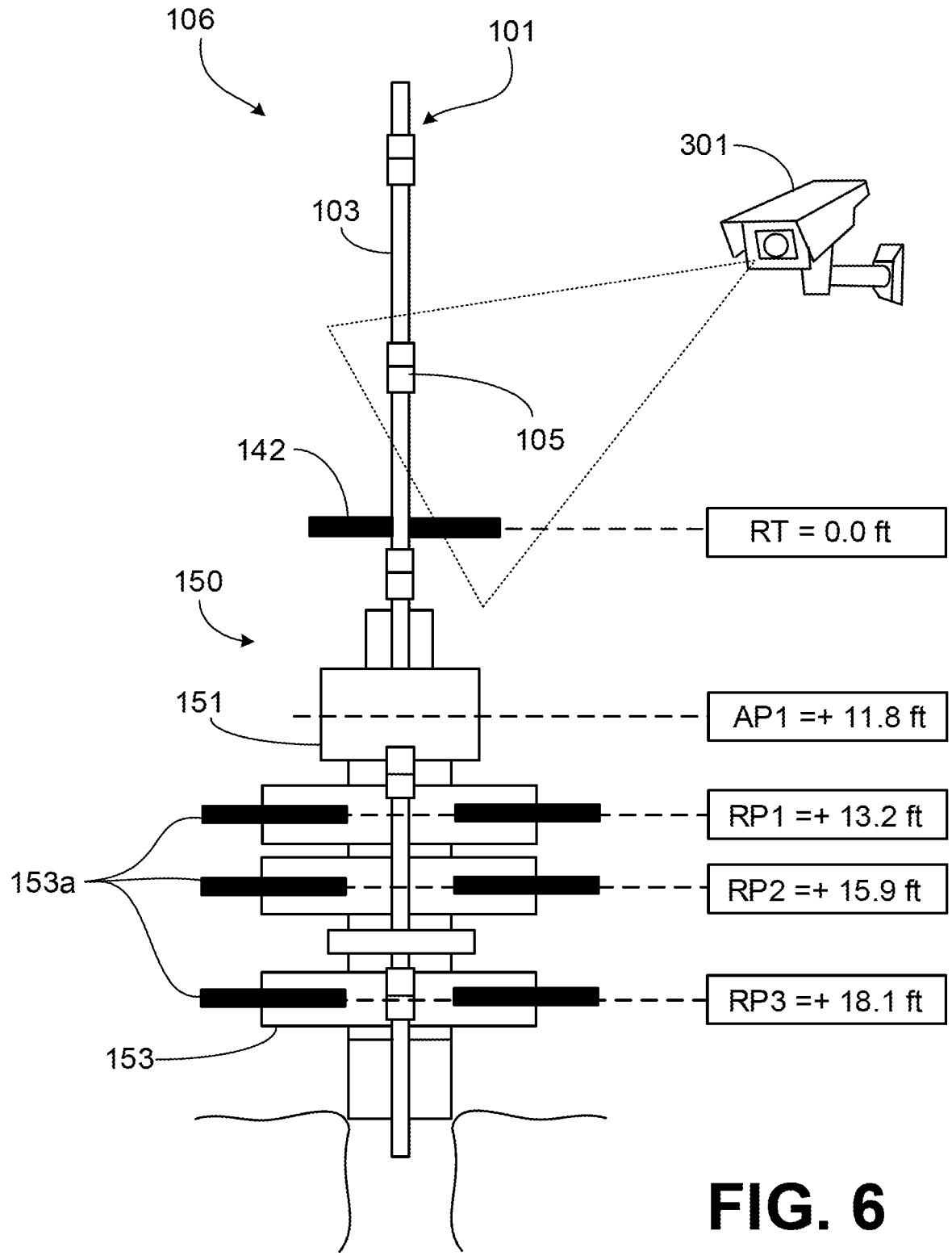
FIGS. 6 and 7 are partial schematic views of the monitoring system of FIG. 3A.
Figure 7:
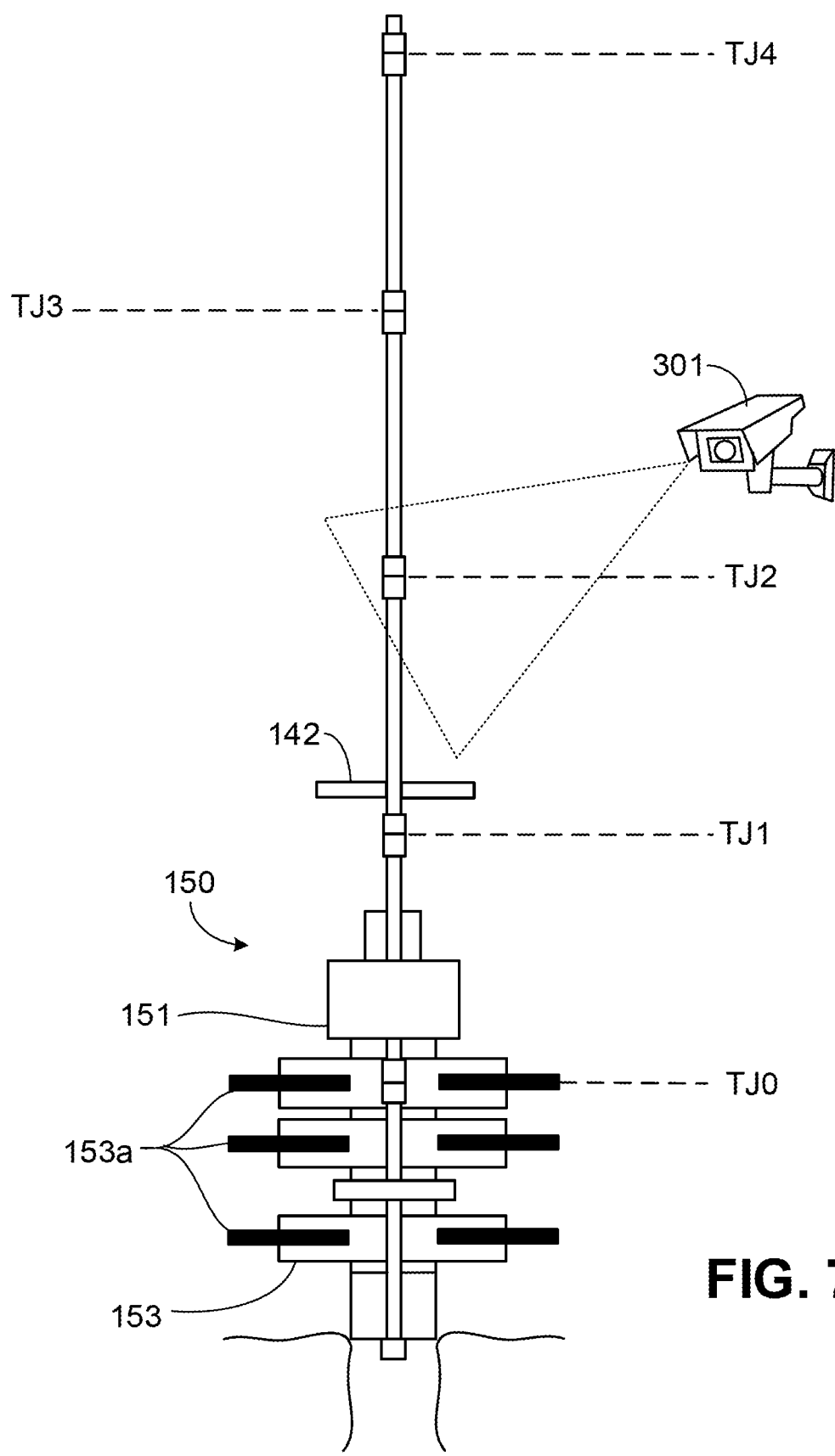

In the example shown in FIG. 6, the reference elevation of the well is the rotary table (RT) 142 located on the drill floor. Because the rotary table 142 is above the components of interest, the following "elevations" are presented as "depths", which can be understood to be the negative of elevation (that is, equal is magnitude, but opposite in sign). The annular blowout preventer 151 (AP 1) has a depth of 11.8 feet. The top-most ram blowout preventer 153 (RP 1) has a depth of 13.2 feet. The middle ram blowout preventer 153 (RP 2) has a depth of 15.9 feet. The bottom-most ram blowout preventer 153 (RP 3) has a depth of 18.1 feet. FIG. 7 illustrates the same example shown in FIG. 6 and identifies the various connections 105 (TJ0, TJ1, TJ2, TJ3, TJ4). At the particular instance shown in FIG. 7, the bottom-most tool joint connection 105 (TJ0) is aligned with the top-most ram blowout preventer 153 (RP 1).

Figure 8:
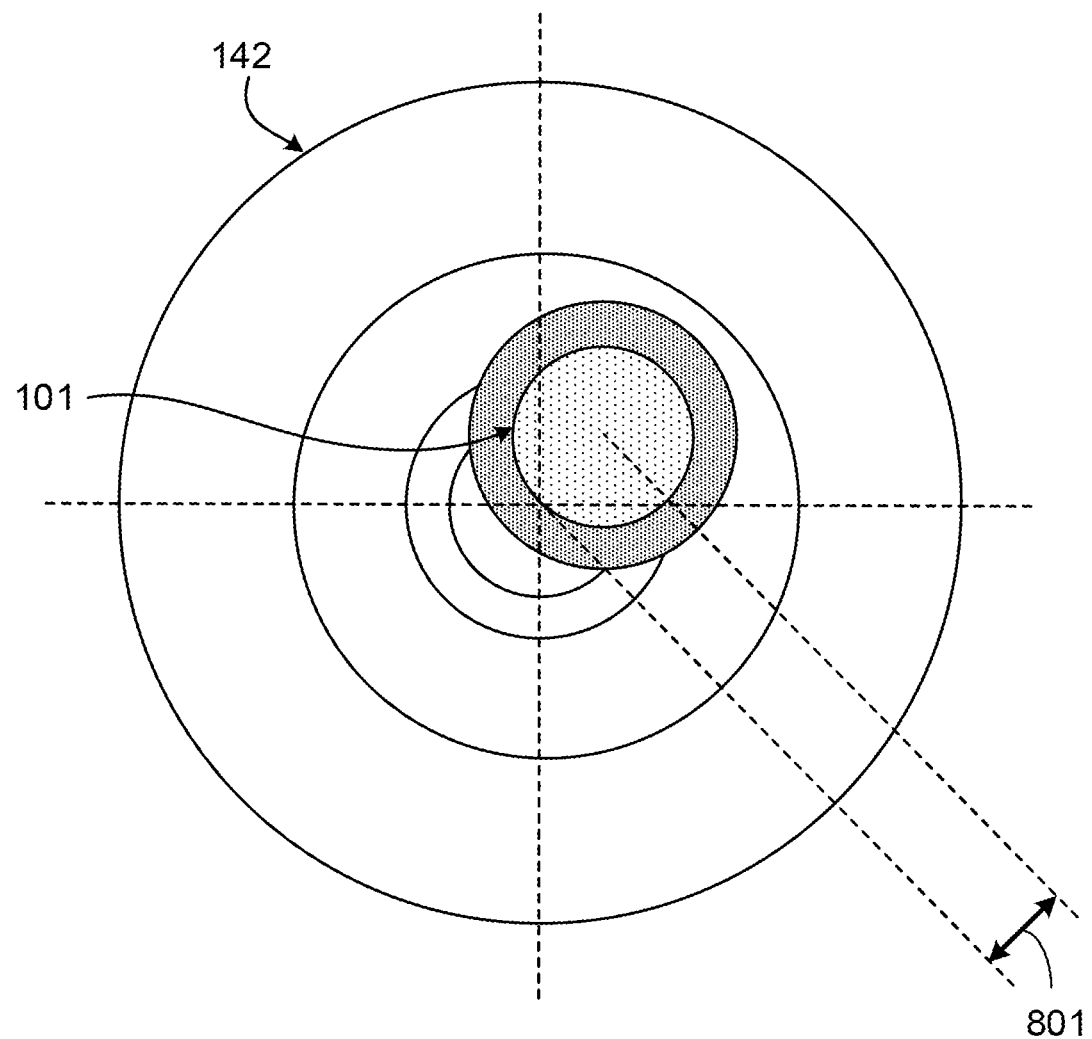
FIG. 8 is a partial schematic bird's-eye view of the rig system of FIG. 1.

The concepts described in this disclosure can optionally be applied in different manners to monitor other characteristics of the rig. For example, FIG. 8 illustrates a bird's-eye-view of the rotary table 142 and the tubular 101 being run into the well. The system 300 can be used to monitor the position of the tubular 101 relative to the rotary table 142. The image sensor 301 can capture such images of the rotary table 142 and tubular 101, and the onsite edge gateway 303 can process the images to determine a displacement 801 of the central axis of the tubular 101 from the central axis of the rotary table 142. If the displacement 801 exceeds a threshold central axis position difference tolerance value, the onsite edge gateway 303 can transmit a signal, for example, to the control panel 350 to alert an operator that the tubular 101 is too off-center or to automatically actuate an actuator (or make another adjustment) that would result in adjusting the axial position of the tubular 101.

Figure 9:
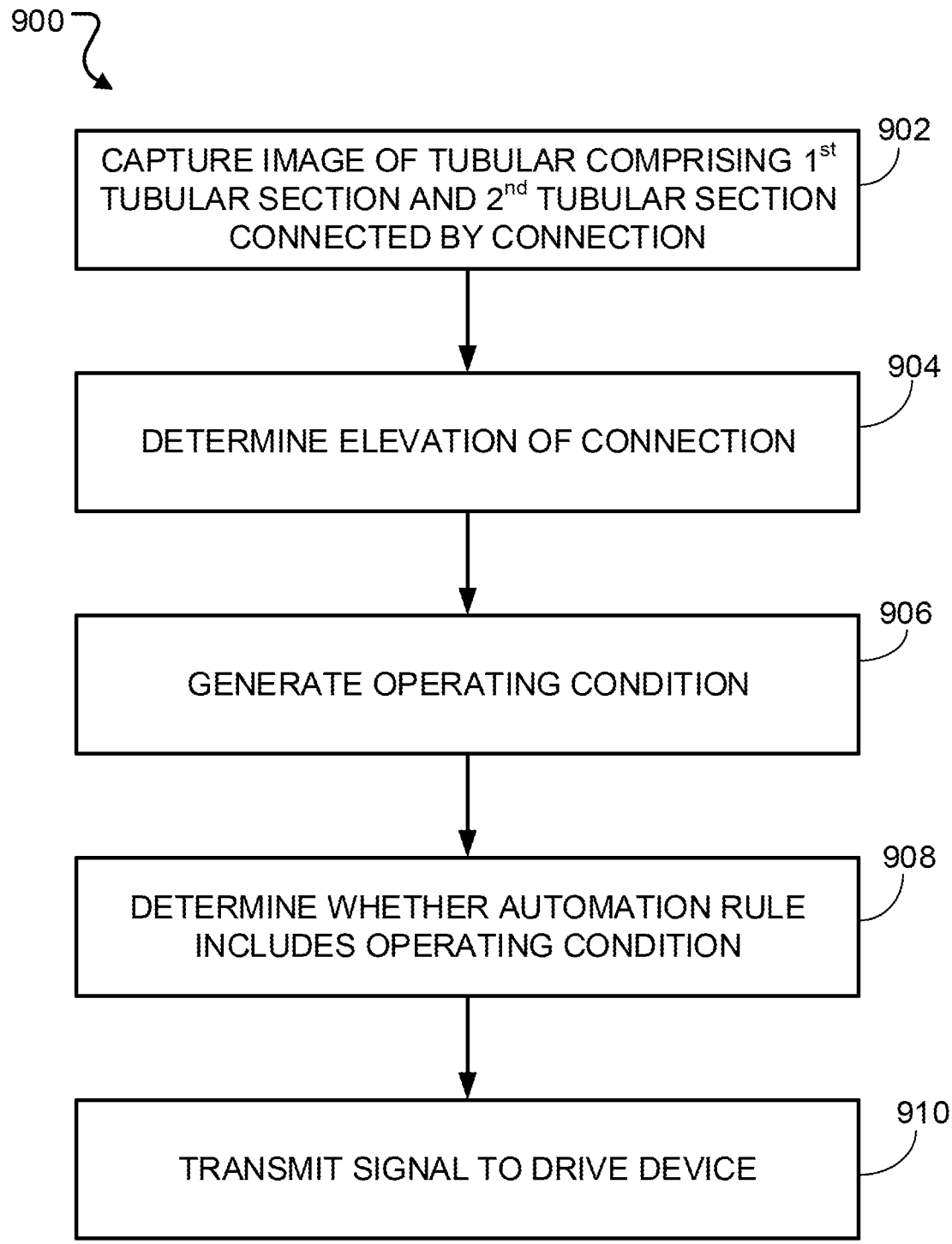
FIG. 9 is a flow chart of an example method for monitoring the rig system of FIG. 1.

FIG. 9 is a flow chart of an example method 900 for monitoring a rig system (such as the rig system 100). For clarity of presentation, the description that follows generally describes method 900 in the context of the other figures in this description. However, it will be understood that method 900 can be performed by any suitable system, environment, software, and hardware, or a combination of systems, environments, software, and hardware as appropriate. For example, the monitoring system 300 (or any system including the monitoring system 300) can be used to implement the method 900. In some implementations, various steps of method 900 can be run in parallel, in combination, in loops, or in any order.

At step 902, one or more images of a tubular (such as the tubular 101) being run into a well are captured. The tubular 101 includes a first tubular section and a second tubular section (such as the tubular sections 103) that are connected together by a connection (such as the connection 105). The tubular 101 can be, for example, a drill string including drill pipes 103 connected together by tool joints 105. The one or more images can be captured, for example, by the image sensor 301 of the monitoring system 300. The one or more images can be provided as an image feed to the onsite edge gateway 303 of the monitoring system 300.

At step 904, an elevation of the connection 105 relative to a reference elevation of the well is determined based on the captured one or more images (from step 902). The onsite edge gateway 303 can process and analyze the one or more images provided as the image feed from the image sensor(s) 301 to determine the elevation of the connection 105. The reference elevation can be, for example, the drill floor 102. In some implementations, the elevations of multiple connections 105 relative to the reference elevation at step 904. Determining the elevation of the connection 105 at step 904 can include distinguishing the connection 105 from the first and second tubular sections 103. As described previously, the onsite edge gateway 303 can perform image processing (for example, edge detection) to identify one or more components based on known characteristics. For example, tool joints 105 typically have larger outer diameters than drill pipes 103, so the onsite edge gateway 303 can distinguish the tool joints 105 from the drill pipes 103 by detecting the larger outer diameter relative to the diameter of the tubular 101.

At step 906, an operating condition is generated based on the determined elevation (from step 904). The operating condition can be, for example, an alignment position of the connection 105 relative to another component of the rig system 100 (such as the blowout preventer 150). In some implementations, the alignment position is relative to a component of the blowout preventer 150, for example, the rams 153*a* and 153*b* of the ram blowout preventer(s) 153. For example, if it is determined that the connection 105 is aligned with the rams 153*a* and 153*b* of one of the ram blowout preventers 153, then the alignment position representing the alignment of the connection 105 to the rams 153*a* and 153*b* is generated. In some implementations, the rate at which the tubular 101 is being run into (or out of) the well can be determined based on at least two captured images provided by the image sensor 301. For example, based on the time difference between the two captured images and the displacement of the connection 105 between the two captured images, the onsite edge gateway 303 can calculate the rate at which the tubular 101 is being run into the well.

At step 908, it is determined whether an automation rule includes the operating condition generated at step 906. The automation rule can be, for example, the condition in which the connection 150 is aligned with the blowout preventer 150 (or a component of the blowout preventer 150, such as the ram blowout preventer 153).

In response to determining that the automation rule includes the operating condition at step 908, a signal is transmitted at step 910 to drive a controllable device. In some implementations, the controllable device is in a remote location (for example, in a location that is not local to the rig). For example, the controllable device is in a control room. In some implementations, the controllable device includes a control panel in a control room (such as the control panel 350), and the signal can drive the control panel to display a representation of the operating condition (from step 906). In some implementations, the controllable device includes an alarm (remote or local), and the signal can trigger the alarm (audio or visual). In some implementations, the controllable device includes a running tool that is running the tubular 101 into or out of the well, and the signal causes the running tool to adjust a rate at which the running tool is running the tubular into or out of the well. In some implementations, the controllable device includes the blowout preventer 150, and the signal causes the blowout preventer 150 to close.

Figure 10:
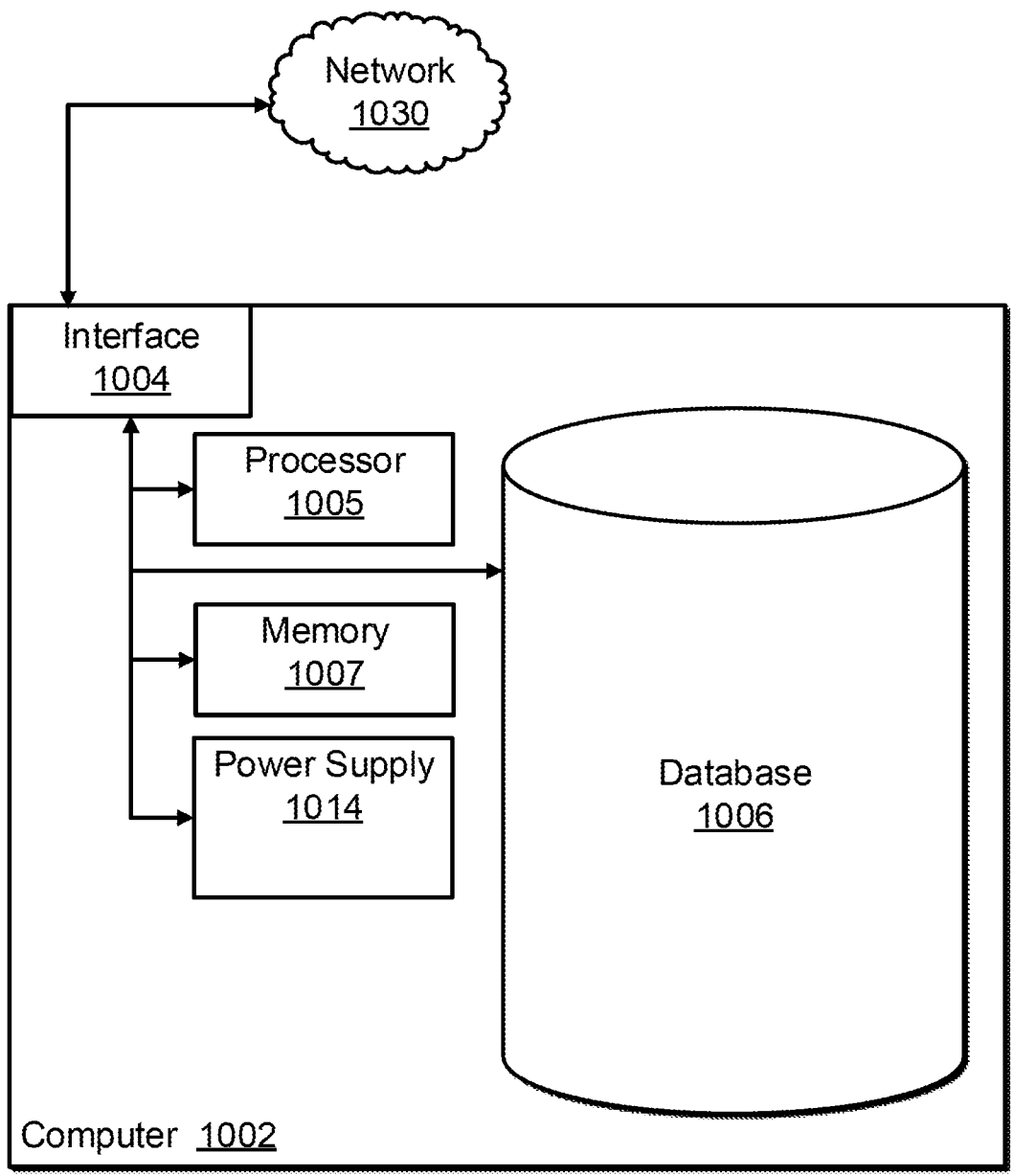
FIG. 10 is a block diagram illustrating the example onsite edge gateway.

FIG. 10 is a block diagram of an example computer system 1000 that can be used to provide computational functionalities associated with described algorithms, methods, functions, processes, flows, and procedures described in the present disclosure, according to some implementations of the present disclosure. In some implementations, the onsite edge gateway 303 can be the computer system 1000 or include the computer system 1000. In some implementations, the onsite edge gateway 303 can communicate with the computer system 1000.

The illustrated computer 1002 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 1002 can include a Smart Embedded Management Agent (SEMA), such as a built-in ADLINK SEMA 2.2, and a video sync technology, such as Quick Sync Video technology supported by ADLINK MSDK+. In some examples, the computer 1002 can include the MXE-5400 Series processor-based fanless embedded computer by ADLINK, though the computer 1002 can take other forms or include other components.

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a high level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus. In some implementations, any or all of the components of the computer 1002, including hardware or software components, can interface with each other or the interface 1004 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 1002 and other components (whether illustrated or not) that are communicably coupled to the computer 1002. The functionality of the computer 1002 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 1002, in alternative implementations, the API or the service layer can be stand-alone components in relation to other components of the computer 1002 and other components communicably coupled to the computer 1002. Moreover, any or all parts of the API or the service layer can be implemented as child or sub-modules of another software module, enterprise application, or hardware module without departing from the scope of the present disclosure.

The computer 1002 can include an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 can also include a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

An application can be an algorithmic software engine providing functionality according to particular needs, desires, or particular implementations of the computer 1002 and the described functionality. For example, an application can serve as one or more components, modules, or applications. Multiple applications can be implemented on the computer 1002. Each application can be internal or external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power-supply 1014 can include a power plug to allow the computer 1002 to be plugged into a wall socket or a power source to, for example, power the computer 1002 or recharge a rechargeable battery.

There can be any number of computers 1002 associated with, or external to, a computer system including computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method, comprising:
    capturing one or more images of a tubular being run into a well, the tubular comprising a first tubular section and a second tubular section connected together by a connection;
    based on the captured one or more images, determining an elevation of the connection relative to a reference elevation of the well;
    based on the determined elevation, generating an operating condition, wherein the operating condition comprises an alignment position of the connection relative to a blowout preventer of the well;
    determining whether an automation rule includes the operating condition, wherein the automation rule comprises a condition in which the connection is aligned with the blowout preventer; and
    in response to determining that the automation rule includes the operating condition, transmitting a signal to drive a controllable device, wherein the controllable device comprises an alarm, and driving the controllable device comprises triggering the alarm.

2. The method of claim 1, wherein the controllable device comprises a control panel in a remote location, and driving the controllable device comprises displaying a representation of the operating condition on the control panel.

3. The method of claim 1, wherein the controllable device comprises a running tool that is running the tubular into the well, and driving the controllable device comprises adjusting a rate at which the running tool is running the tubular into the well.

4. The method of claim 1, wherein the controllable device comprises the blowout preventer, and driving the controllable device comprises closing the blowout preventer.

5. The method of claim 1, comprising determining a rate at which the tubular is being run into the well based on at least two captured images.

6. The method of claim 1, wherein determining the elevation of the connection comprises distinguishing the connection from the first and second tubular sections.

7. The method of claim 6, wherein:
    the first tubular section comprises a first drill pipe;
    the second tubular section comprises a second drill pipe;
    the connection comprises a tool joint; and
    distinguishing the connection from the first and second tubular sections comprises identifying the tool joint based on detecting an outer diameter of the tool joint.

8. A system, comprising:
    an image sensor configured to capture an image stream of a tubular being run into a well, wherein the image sensor is portable, and the tubular comprising a first tubular section and a second tubular section connected together by a connection; and
    an onsite edge gateway local to the image sensor and communicatively coupled to the image sensor, the onsite edge gateway configured to perform operations comprising:
        receiving an image stream from the image sensor;
        determining, from the image stream, an elevation of the connection relative to a reference elevation of the well;
        generating, based on the determined elevation, an operating condition;
        determining whether an automation rule includes the operating condition; and
        in response to determining that the automation rule includes the operating condition, transmitting a signal to drive a controllable device in a remote location.

9. The system of claim 8, wherein the image sensor is mounted in a fixed position.

10. The system of claim 8, wherein the onsite edge gateway comprises one or more processors and a computer-readable storage medium coupled to the one or more processors and storing programming instructions for execution by the one or more processors, and the programming instructions instruct the one or more processors to perform the operations.

11. The system of claim 10, wherein the generating the operating condition comprises determining an alignment position of the connection relative to a blowout preventer of the well.

12. The system of claim 11, wherein the automation rule comprises a condition in which the connection is aligned with the blowout preventer.

13. The system of claim 12, comprising the controllable device, wherein:
    the controllable device comprises a control panel; and
    driving the controllable device comprises displaying a representation of the operating condition on the control panel.

14. The system of claim 12, comprising the controllable device, wherein:
    the controllable device comprises an alarm; and driving the controllable device comprises triggering the alarm.

15. The system of claim 12, comprising the controllable device, wherein:
the controllable device comprises a running tool configured to run the tubular into the well; and
driving the controllable device comprises adjusting a rate at which the running tool is running the tubular into the well.

16. The system of claim 12, comprising the controllable device, wherein:
the controllable device comprises the blowout preventer; and
driving the controllable device comprises closing the blowout preventer.

17. The system of claim 10, wherein the onsite edge gateway is configured to determine a rate at which the tubular is being run into the well based on at least two captured images received from the image sensor.

18. The system of claim 10, wherein the onsite edge gateway is configured to distinguish the connection from the first and second tubular sections.

19. A method, comprising:
capturing one or more images of a tubular being run into a well, the tubular comprising a first tubular section and a second tubular section connected together by a connection;
based on the captured one or more images, determining an elevation of the connection relative to a reference elevation of the well;
determining a rate at which the tubular is being run into the well based on at least two captured images of the one or more images;
based on the determined elevation, generating an operating condition;
determining whether an automation rule includes the operating condition; and
in response to determining that the automation rule includes the operating condition, transmitting a signal to drive a controllable device.

20. A method, comprising:
capturing one or more images of a tubular being run into a well, the tubular comprising a first tubular section and a second tubular section connected together by a connection;
based on the captured one or more images, determining an elevation of the connection relative to a reference elevation of the well, wherein determining the elevation of the connection comprises distinguishing the connection from the first and second tubular sections;
based on the determined elevation, generating an operating condition;
determining whether an automation rule includes the operating condition; and
in response to determining that the automation rule includes the operating condition, transmitting a signal to drive a controllable device.

21. The method of claim 20, wherein:
the first tubular section comprises a first drill pipe;
the second tubular section comprises a second drill pipe;
the connection comprises a tool joint; and
distinguishing the connection from the first and second tubular sections comprises identifying the tool joint based on detecting an outer diameter of the tool joint.

22. The method of claim 20, wherein:
the operating condition comprises an alignment position of the connection relative to a blowout preventer of the well; and
the automation rule comprises a condition in which the connection is aligned with the blowout preventer.

* * * * *